(12) United States Patent
Vu

(10) Patent No.: US 10,941,867 B2
(45) Date of Patent: Mar. 9, 2021

(54) HIGH CONDUCTANCE VALVE FOR FLUIDS AND VAPORS

(71) Applicant: HORIBA STEC, Co., Ltd., Kyoto (JP)

(72) Inventor: Kim Ngoc Vu, Yorba Linda, CA (US)

(73) Assignee: HORIBA STEC, Co., Ltd., Kyoto (JP)

(*) Notice: Subject to any disclaimer, the term of this patent is extended or adjusted under 35 U.S.C. 154(b) by 0 days.

(21) Appl. No.: 16/282,669

(22) Filed: Feb. 22, 2019

(65) Prior Publication Data
US 2019/0226588 A1    Jul. 25, 2019

Related U.S. Application Data

(62) Division of application No. 14/737,564, filed on Jun. 12, 2015, now Pat. No. 10,240,679.
(Continued)

(51) Int. Cl.
*F16K 1/42* (2006.01)
*F16K 27/02* (2006.01)
(Continued)

(52) U.S. Cl.
CPC .............. *F16K 1/42* (2013.01); *F16K 1/12* (2013.01); *F16K 11/04* (2013.01); *F16K 27/02* (2013.01);
(Continued)

(58) Field of Classification Search
CPC ..... F16K 1/42; F16K 1/12; F16K 1/36; F16K 31/0655; F16K 11/04; F16K 27/02; Y10T 137/0318; Y10T 137/86493
See application file for complete search history.

(56) References Cited

U.S. PATENT DOCUMENTS 2,548,239 A * 4/1951 Ray .............. H01F 7/1638
335/297
2,642,260 A ‡ 6/1953 Moore ................ F16K 1/42
137/53
(Continued)

FOREIGN PATENT DOCUMENTS

CH     251490 A  ‡  8/1948  .............. F16K 1/42
CN   102812276 A  ‡ 12/2012  ......... F16K 99/0001
(Continued)

OTHER PUBLICATIONS

International Search Report and Written Opinion from PCT/US2015/035487 dated Aug. 27, 2015.‡
(Continued)

*Primary Examiner* — Kevin F Murphy
*Assistant Examiner* — Patrick C Williams
(74) *Attorney, Agent, or Firm* — Alleman Hall Creasman & Tuttle LLP

(57) ABSTRACT

A high conductance valve for use in fluid delivery systems is comprised of a flat non-circular orifice ridge adjacent to which a control plate having a planar control surface is proximally positioned to adjust the valve effective opening area and thereby the conductance of the valve. The length of the non-circular orifice ridge periphery is substantially greater than the circumference of a similarly sized circular orifice and therefore the realized effective opening area is also substantially greater despite having a similar footprint.

12 Claims, 23 Drawing Sheets

Related U.S. Application Data

(60) Provisional application No. 62/011,873, filed on Jun. 13, 2014.

(51) Int. Cl.
*F16K 11/04* (2006.01)
*F16K 1/12* (2006.01)
*F16K 31/06* (2006.01)
*F16K 1/36* (2006.01)

(52) U.S. Cl.
CPC ............ *F16K 31/0655* (2013.01); *F16K 1/36* (2013.01); *Y10T 137/0318* (2015.04); *Y10T 137/86493* (2015.04)

(56) References Cited

U.S. PATENT DOCUMENTS

| | | | | |
|---|---|---|---|---|
| 3,206,530 A ‡ | 9/1965 | Boteler | ............... | F16K 27/0236 137/375 |
| 3,257,097 A ‡ | 6/1966 | Boteler | ................... | F16K 7/123 251/331 |
| 3,275,292 A ‡ | 9/1966 | Boteler | ............... | F16K 27/0236 251/331 |
| 3,278,156 A ‡ | 10/1966 | Callahan, Jr. | ........... | F16K 41/10 251/33 |
| 3,300,844 A ‡ | 1/1967 | Boteler | ................... | B21C 37/29 251/331 |
| 3,374,522 A ‡ | 3/1968 | Boteler | ............... | F16K 27/0236 251/331 |
| 3,407,838 A ‡ | 10/1968 | Boteler | ............... | F16K 27/0236 137/375 |
| 3,942,547 A | 3/1976 | Pfitzner | | |
| 4,606,374 A ‡ | 8/1986 | Kolenc | ................... | F16K 37/00 137/55 |
| 4,732,363 A ‡ | 3/1988 | Kolenc | ................... | F16K 41/12 251/33 |
| 4,964,423 A ‡ | 10/1990 | Gausman | ................ | F16K 15/02 137/54 |
| 4,977,916 A ‡ | 12/1990 | Ohmi | ........................ | G01F 1/68 137/48 |
| 5,145,147 A ‡ | 9/1992 | Nakazawa | ............ | F16K 31/007 251/11 |
| 5,279,328 A ‡ | 1/1994 | Linder | ...................... | F16K 7/16 137/59 |
| 5,730,423 A ‡ | 3/1998 | Wu | .......................... | F16K 7/14 251/33 |
| 5,755,428 A ‡ | 5/1998 | Ollivier | ..................... | F16K 7/14 251/33 |
| 5,992,463 A ‡ | 11/1999 | Redemann | ............... | C23C 16/44 137/24 |
| 6,234,206 B1 * | 5/2001 | Malmberg | ............... | A01J 11/16 137/625.33 |
| 7,290,564 B2 * | 11/2007 | Takahashi | .......... | F02M 25/0836 137/625.25 |
| 8,070,132 B2 ‡ | 12/2011 | Hall | .......................... | F16K 1/06 251/31 |
| 9,291,279 B2 ‡ | 3/2016 | Wopper | ............... | F16K 27/0236 |
| 2006/0169941 A1 ‡ | 8/2006 | Glime | ....................... | F16K 1/34 251/33 |
| 2006/0174945 A1 ‡ | 8/2006 | Maula | ....................... | F16K 7/14 137/34 |
| 2009/0141584 A1 ‡ | 6/2009 | Boer | ...................... | B01F 3/0807 366/33 |
| 2010/0243076 A1 * | 9/2010 | Hayashi | .................. | F16K 25/00 137/455 |
| 2013/0032600 A1 ‡ | 2/2013 | Umezaki | ................. | F16K 1/302 220/58 |
| 2014/0264104 A1 ‡ | 9/2014 | Ringer | .................... | F16K 7/126 251/61.2 |
| 2015/0059877 A1 ‡ | 3/2015 | Vu | ......................... | F16K 27/029 137/48 |

FOREIGN PATENT DOCUMENTS

| | | | | |
|---|---|---|---|---|
| DE | 1070190 B | ‡ | 12/1959 | ............ F16K 47/04 |
| EP | 1610044 A2 | ‡ | 12/2005 | ............... F16K 7/16 |
| JP | S5563072 A | | 5/1980 | |
| JP | 2012127487 A | ‡ | 7/2012 | ............... F16K 7/14 |
| WO | 2015/075158 A1 | | 5/2015 | |

OTHER PUBLICATIONS

European Patent Office, Extended European Search Report Issued in European Application No. 15805948.5, dated Feb. 15, 2018, Germany, 8 pages.‡

State Intellectual Property Office of the People's Republic of China, Office Action and Search Report Issued in Application No. 201580031746.1, dated May 30, 2018, 20 pages.‡

Japanese Patent Office, Office Action Issued in Application No. 2016572560, dated Jul. 1, 2019, 11 pages.

Japan Patent Office, Decision to Grant a Patent in Application No. 2016-572560 dated Nov. 14, 2019, 5 pages.

\* cited by examiner
‡ imported from a related application

Detail View B

Kidney Orifice

Section C-C

See Detail View D

Section E-E

Section F-F

Detail View E

Section H-H

Section J-J

Detail View F

Section G-G

Section M-M

Section N-N

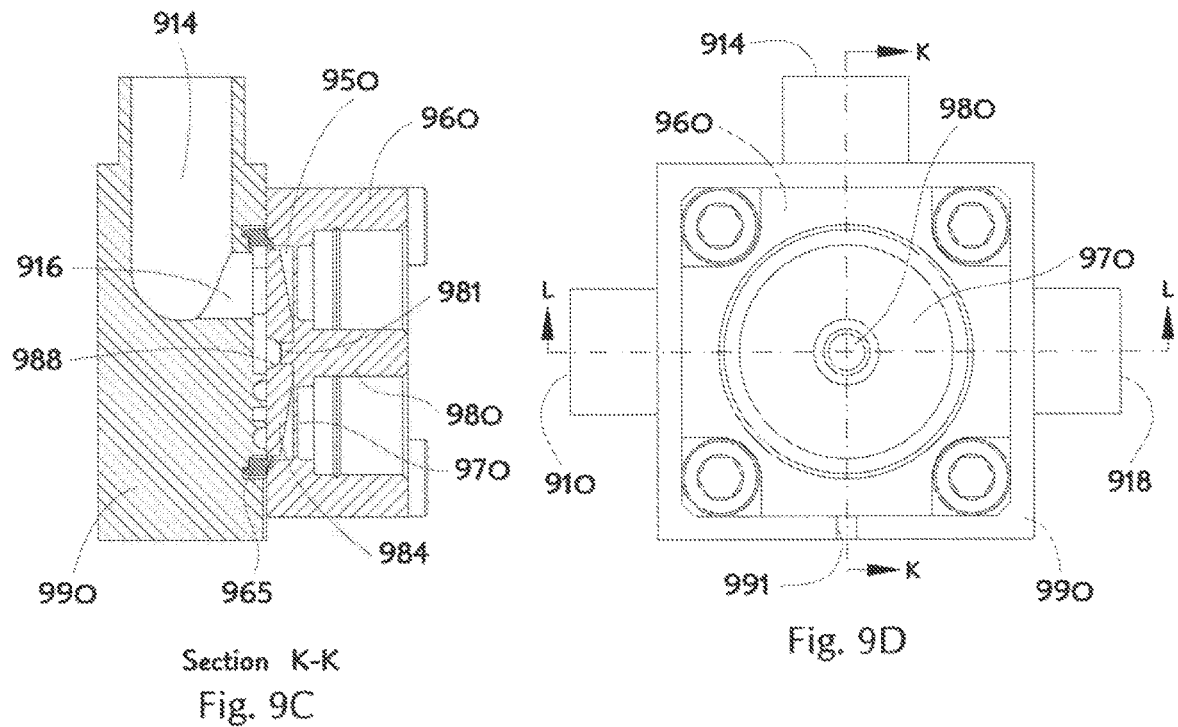
Section K-K
Fig. 9C
Fig. 9D
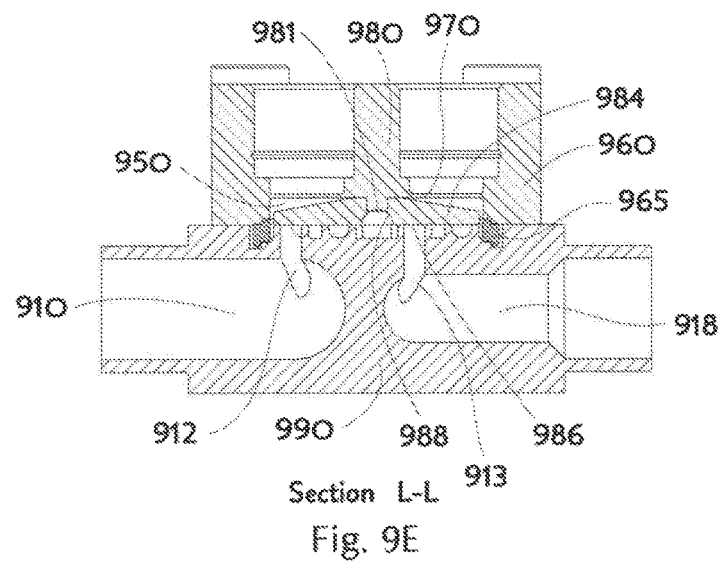
Section L-L
Fig. 9E

Detail View G

Detail View H

HIGH CONDUCTANCE VALVE FOR FLUIDS AND VAPORS

CROSS-REFERENCE TO RELATED APPLICATIONS

This application is a divisional of U.S. patent application Ser. No. 14/737,564 filed Jun. 12, 2015, titled "HIGH CONDUCTANCE VALVE FOR FLUIDS AND VAPORS," which claims the benefit under 35 U. S.C. § 119(e) and PCT Article 8 to U.S. Provisional Application Ser. No. 62/011,873 titled "HIGH CONDUCTANCE VALVE FOR FLUIDS AND VAPORS," filed Jun. 13, 2014, which is hereby incorporated by reference in its entirety for all purposes. This application makes reference to U.S. patent application Ser. No. 14/477,573 titled "INTERLACE LIFTING MECHANISM," filed Sep. 4, 2014 and is published as US2015/0059877.

BACKGROUND

The present invention is related to the field of valves which is ancient and widely known. A very simple valve may be comprised of an inlet channel, an outlet channel, and a moveable or deformable control element interposed between the channels. Movement or deformation Or both) of the control element regulates the transit of fluid from one channel to the other. The direction of fluid transit may be unrelated to nominal designations such as inlet and outlet, as is well known, or such designations may be chosen for reasons related to application such as in the case of a check valve intended to limit flow to only a preferred direction. Many valves have inlet and outlet channels which are formed as fluid conduits within portions of a valve body and a control element which is moved by an actuator Or the fluid itself) to changeable locations within a chamber of the valve. Controlled fluids may be liquids, gases, vacuum, vapors, or combinations of substances in those states. It is generally desirable to have most of the actuator not in contact with the controlled fluid. For example, a manual actuator having a knob for a person to grasp should avoid having the controlled fluid get on the person's hand. Many designs exist for allowing actuator movement while simultaneously retaining the controlled fluid within the valve chamber and sealingly separated from the actuator. Valves having actuators intended for simple on-off control of fluids as well as valves designed for proportional, or modulating, control of fluid delivery within industrial processes making semiconductor devices, pharmaceuticals, fine chemicals, and many similar fluid delivery systems, are well known.

Any fluid delivery apparatus intended for manipulating process materials within semiconductor manufacturing equipment usually requires attention to maintaining high purity of the delivered reactants. Mechanical shafts sliding or rotating within a packing type of seal arrangement are known to often cause detectable particulate contamination of high purity process materials. Fluids that are radioactive, poisonous, pyrophoric, or otherwise dangerous, may also be thought less safe when handled in an apparatus having packing type seals. In response to these concerns, designers developed valves whereby the actuator sealing is done by a flexible, usually metallic, element that separates the valve chamber from an external environment surrounding the valve. U.S. Pat. No. 3,278,156 issued to F. J. Callahan Jr., et al., is one example of a valve with a manual actuator using a metallic bellows for sealing the controlled fluid from the surrounding environment. Later experience revealed the relatively large surface area associated with the pleats of a bellows may be problematic with regard to internal sources of contamination in high purity fluid delivery systems. U.S. Pat. Nos. 4,606,374 and 4,732,363 both issued to Terrence J. Kolenc, et al, are two examples of valves using diaphragms, having fluid exposed surface area somewhat lower than bellows, for sealing and are also shown with manual actuators. A variety of actuator types, including pneumatic and electric, may be used with both bellows and diaphragm sealed valves, as is well known. The desire to absolutely minimize all possible moisture absorption sites within a high purity fluid delivery pathway has led to valve designs absent any internal polymeric material, and thus designs dealing with metal to metal contact between a moveable control element and a fluid conduit opening within the valve chamber. U.S. Pat. No. 5,730,423 issued to Jing-Chau Wu, et al., and U.S. Pat. No. 5,755,428 issued to Louis A. Ollivier are two examples of valves having metal diaphragms directly contacting a toroidal bead valve seat surrounding a fluid conduit opening within a valve body.

SUMMARY

In consideration of the foregoing applicant has developed a high conductance valve suited to fluid delivery that is comprised of a flat, typically non-circular, orifice ridge adjacent to which a control plate having a planar control surface is proximally positioned to adjust the valve effective opening area and thereby the conductance of the valve. The length of the non-circular orifice ridge periphery is substantially greater than the circumference of a similarly sized circular orifice and therefore the realized effective opening area is also substantially greater despite having a similar footprint. Additionally, a plurality of orifice ridges may be used within a single valve to obtain the benefits of the total orifice ridge periphery length being greater than the circumference of a similarly sized circular orifice.

In a first embodiment a non-circular orifice ridge has a kidney-like shape and a control plate may be positioned by any suitable actuator arrangement. In a second embodiment a non-circular orifice ridge has a kidney-like shape and a control plate is biased by a disk spring so as to form a check valve. In another embodiment a non-circular orifice ridge includes a plurality of petal-like loops and may be used for any of the preceding functions in addition to being suitable for flow division purposes. In another embodiment a portion of a valve chamber outer cavity partially surrounded by a large kidney-like orifice ridge shape is filled with a second similar and smaller kidney-like orifice ridge also in fluid communication with the same fluid conduit that feeds fluid to the large kidney-like orifice ridge. In another embodiment a plurality of non-circular orifice ridge shapes are in parallel fluid communication with a common valve inlet region. In another embodiment a first orifice ridge completely surrounds a second orifice ridge and creates a valve chamber inner cavity which admits flow to a valve chamber outer cavity comprised of two portions.

At least one embodiment of the disclosure is directed to a valve that includes a valve body having a first fluid conduit opening, an orifice ridge disposed within the valve body and having a plurality of interconnected segments that form a non-circular closed circuit surrounding the first fluid conduit opening, the plurality of interconnected segments including at least one segment that curves away from the first fluid conduit opening, and a control plate having a substantially planar control surface, the control surface configured to be positioned above the orifice ridge.

According to a further embodiment, the valve body includes a second fluid conduit opening. According to some embodiments, the second fluid conduit opening is disposed external to the orifice ridge.

According to another embodiment, the plurality of segments further include at least one segment that curves toward the first fluid conduit opening. According to a further embodiment, the at least one segment that curves away from the first fluid conduit opening is adjacent to the at least one segment that curves toward the first fluid conduit opening.

According to another embodiment, the control plate is moveable between a first position in which the substantially planar control surface abuts the orifice ridge and a second position in which at least a portion of the substantially planar control surface is separated from the orifice ridge.

According to some embodiments, the non-circular closed circuit includes a plurality of segments that curve away from the first fluid conduit opening.

According to another embodiment, the orifice ridge is a first orifice ridge, the valve body includes a second fluid conduit opening, and the valve further includes a second orifice ridge disposed within the valve body and having a plurality of interconnected segments that form a non-circular closed circuit surrounding the second fluid conduit opening. According to a further embodiment, the valve body includes a first fluid conduit, and the first fluid conduit opening and the second fluid conduit opening extend into the first fluid conduit. According to another embodiment, the valve body includes a third fluid conduit opening disposed external to the first orifice ridge and the second orifice ridge. According to a further embodiment, the valve body includes a first fluid conduit, a second fluid conduit, and a third fluid conduit, the first fluid conduit opening extending into the first fluid conduit, the second fluid conduit opening extending into the second fluid conduit, and the third fluid conduit opening extending into the third fluid conduit, the third fluid conduit being configured as a fluid inlet to receive a flow of fluid and the first and second fluid conduits being configured as fluid outlets, an amount of fluid controllably provided by the third fluid conduit opening being split between the first fluid conduit opening and the second fluid conduit opening.

According to certain embodiments, the valve body includes a fluid conduit and the first fluid conduit opening extends into the fluid conduit, wherein the length of the first orifice ridge is substantially greater than a perimeter length of the fluid conduit.

At least one embodiment of the disclosure is directed to a valve that includes a valve body having a first fluid conduit opening and a second fluid conduit opening, a first orifice ridge disposed within the valve body and having a plurality of interconnected segments that form a closed circuit surrounding the first fluid conduit opening, a second orifice ridge disposed within the valve body and having a plurality of interconnected segments that form a closed circuit surrounding the second fluid conduit opening, and a control plate having a substantially planar control surface, the control surface configured to be moveable to abut the first orifice ridge and the second orifice ridge.

According to another embodiment, the valve further includes a first fluid conduit formed in the valve body, wherein the first fluid conduit opening extends into the first fluid conduit.

According to some embodiments, a length of the first orifice ridge is substantially greater than a perimeter length of the first fluid conduit.

According to another embodiment, the valve further includes a second fluid conduit formed in the valve body, wherein the first fluid conduit is configured as a fluid inlet to receive a flow of fluid and the second fluid conduit is configured as a fluid outlet to provide the flow of fluid.

According to another embodiment, the valve further includes an outer fluid conduit opening disposed within the valve body external to the first orifice ridge and external to the second orifice ridge. According to a further embodiment, the valve further includes a second fluid conduit formed in the valve body, wherein the outer fluid conduit opening extends into the second fluid conduit and the second fluid conduit opening extends into the first conduit.

According to some embodiments, the second fluid conduit opening extends into the first fluid conduit.

According to one embodiment, the valve further includes a third orifice ridge disposed within the valve body and having a plurality of segments that form a non-circular closed circuit surrounding a third fluid conduit opening. According to a further embodiment, the valve further includes a second fluid conduit formed in the valve body, wherein the third fluid conduit opening extends into the second fluid conduit.

According to one embodiment, the valve further includes a second fluid conduit and a third fluid conduit, wherein the second fluid conduit opening extends into the third fluid conduit and the outer fluid conduit opening extends into the second fluid conduit. According to a further embodiment, the outer fluid conduit opening is configured as a fluid inlet to receive a flow of fluid from the second fluid conduit, and the first fluid conduit and the third fluid conduit are configured as fluid outlets, an amount of fluid controllably received at the outer fluid conduit opening being split between the first fluid conduit opening and the second fluid conduit opening. According to a further embodiment, the amount of fluid controllably received at the outer fluid conduit opening from the second fluid conduit is split based upon a length of the first orifice ridge relative to a sum of the length of the first orifice ridge and a length of the second orifice ridge.

According to some embodiments, the second orifice ridge is spaced apart from and at least partially surrounded by the first orifice ridge. According to another embodiment, the second orifice ridge is completely surrounded by the first orifice ridge.

According to some embodiments, at least one of the first orifice ridge and the second orifice ridge form a non-circular closed circuit.

According various embodiments, at least one of the plurality of segments of the first orifice ridge and the second orifice ridge includes at least one curved segment.

According to certain embodiments, the plurality of segments of the first orifice ridge and the second orifice ridge are interconnected inwardly and outwardly curved segments.

According to at least one embodiment, the orifice ridge is constructed from a metallic alloy formed from a type 316 stainless steel.

According to some embodiments, the control plate is constructed from a corrosion resistant nickel alloy.

At least one embodiment of the disclosure is directed to a method of increasing available valve conductance wherein a valve having a control element with limited motion is afforded increased effective opening area by including a path of changing curvature in a periphery of a controlled orifice, the path of changing curvature including at least one portion that curves outwardly.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 9C is a first cross-sectioned view of the valve shown in FIG. 9 with an attached control element;

FIG. 9D is a plan view of the valve shown in FIG. 9C;

FIG. 9E illustrates a second cross-sectioned view of the valve shown in FIG. 9 with an attached control element;

DETAILED DESCRIPTION

Figure 1:
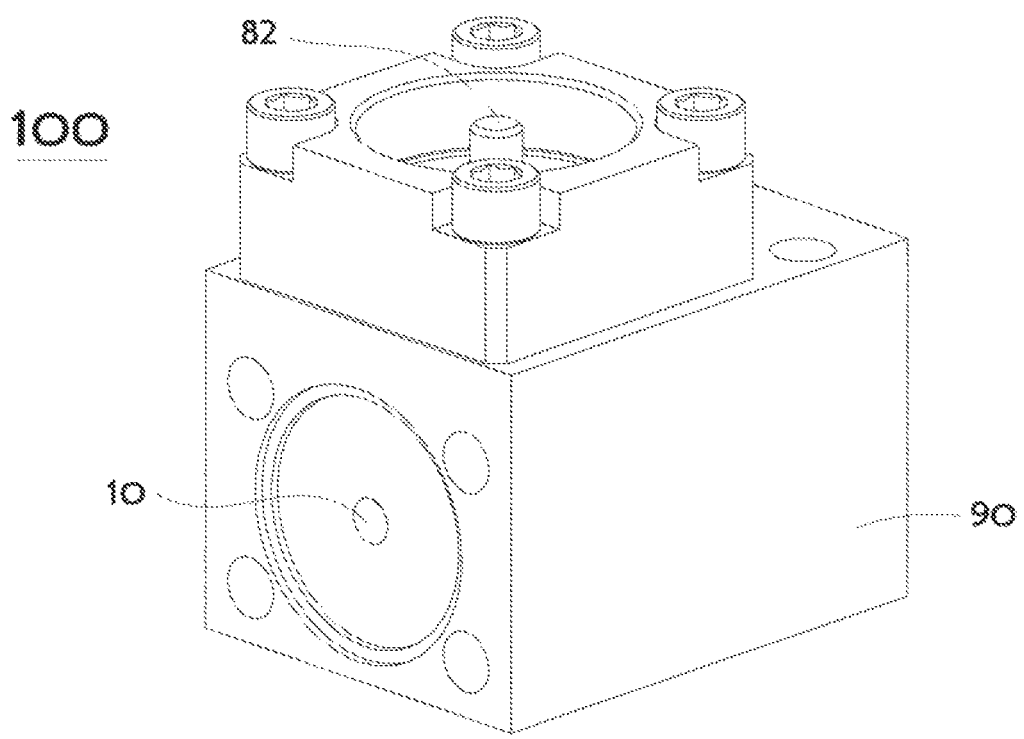
FIG. 1 illustrates a perspective view of a typical standard design all-metal valve.

This invention is not limited in its application to the details of construction and the arrangement of components set forth in the following description or illustrated in the drawings. The invention is capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The use of directional adjectives "inner, "outer," "upper," "lower," and like terms, are meant to assist with understanding relative relationships among design elements and should not be construed as meaning an absolute direction in space nor regarded as limiting.

Figure 1A:
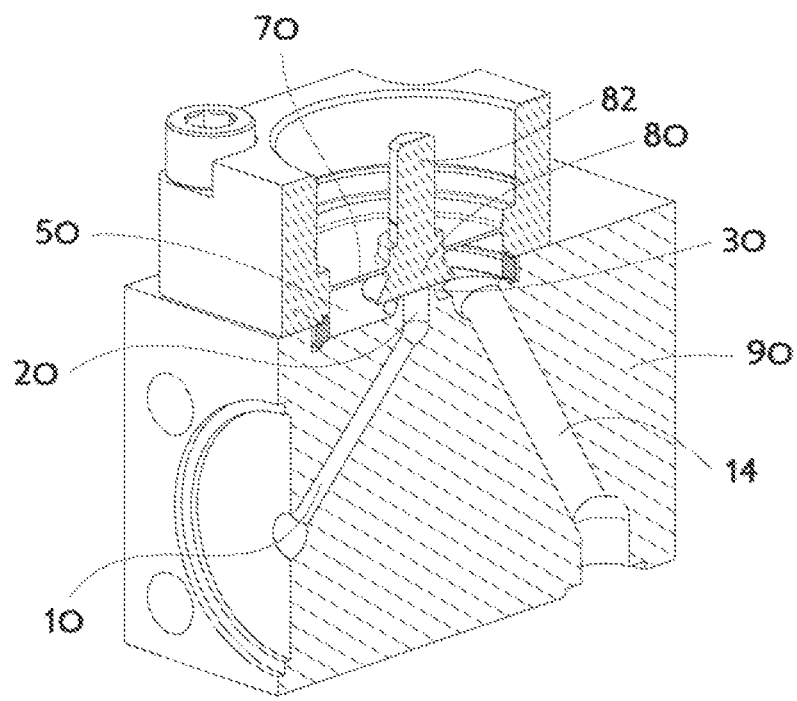
FIG. 1A illustrates a cross-sectioned perspective view of the fluid enclosing portion of the valve of FIG. 1.

A representative example of a typical usual design valve 100 for use in a high purity fluid delivery application is illustrated in FIGS. 1 and 1A. The usual design valve comprises a body 90, an inlet conduit 10, an outlet conduit 14, both of which communicate fluid to a valve chamber 50, a chamber sealing diaphragm 70, and a control element 80 moveable by deflection of the diaphragm 70. The manner of controlling fluid flow may be further understood by considering an orifice 20, through which the inlet conduit 10 discharges fluid into the valve chamber 50, and an orifice ridge 30 surrounding said orifice 20, thereby defining a small clearance control gap with respect to the control element 80 which may be changeably positioned by force applied to a control shaft 82, and through which control gap fluid may flow. It should be appreciated the illustration of FIG. 1A shows the usual design valve in a fully closed not flowing fluid condition and therefore no control gap, as such, is to be revealed in the illustrated configuration.

Figure 2A:
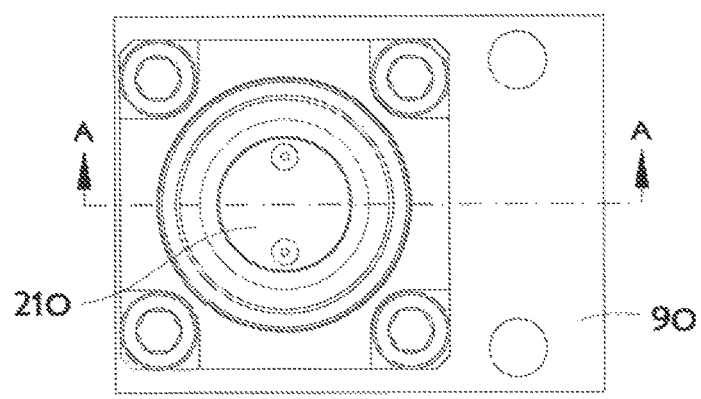
FIG. 2A illustrates a plan view of the valve shown in FIGS. 1 and 1A with a typical piezoelectric actuator attached.
Figure 2B:
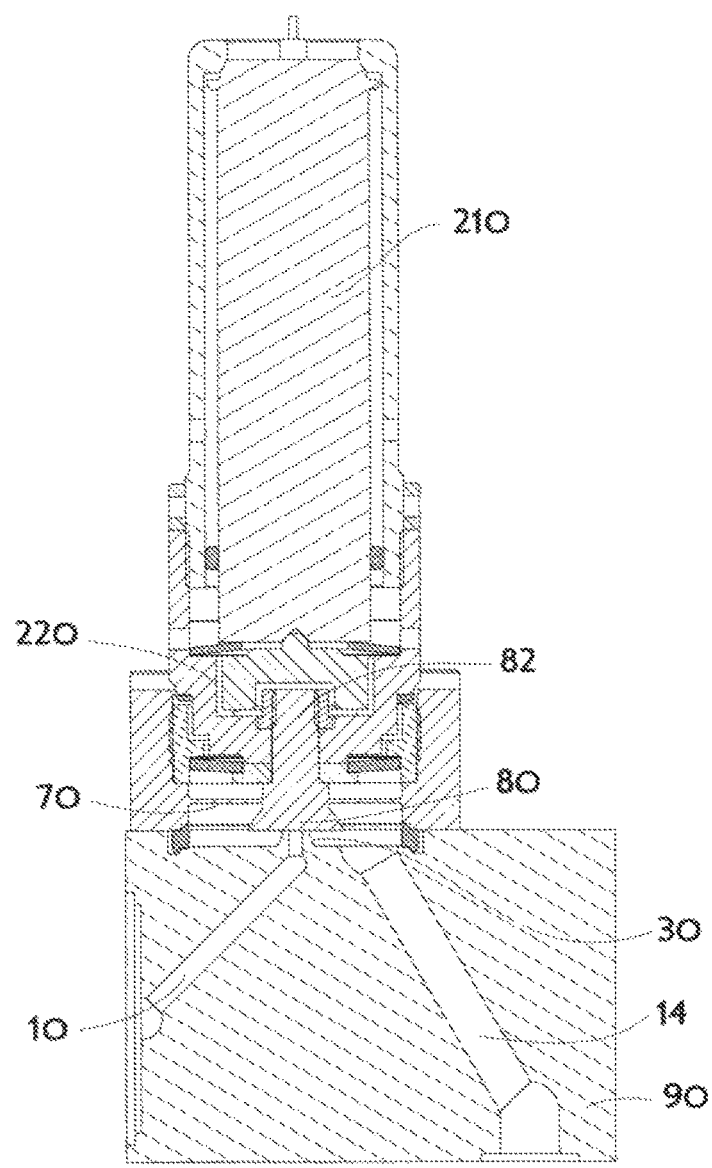
FIG. 2B illustrates a cross-sectioned view of the valve of FIG. 2A.
Figure 3:
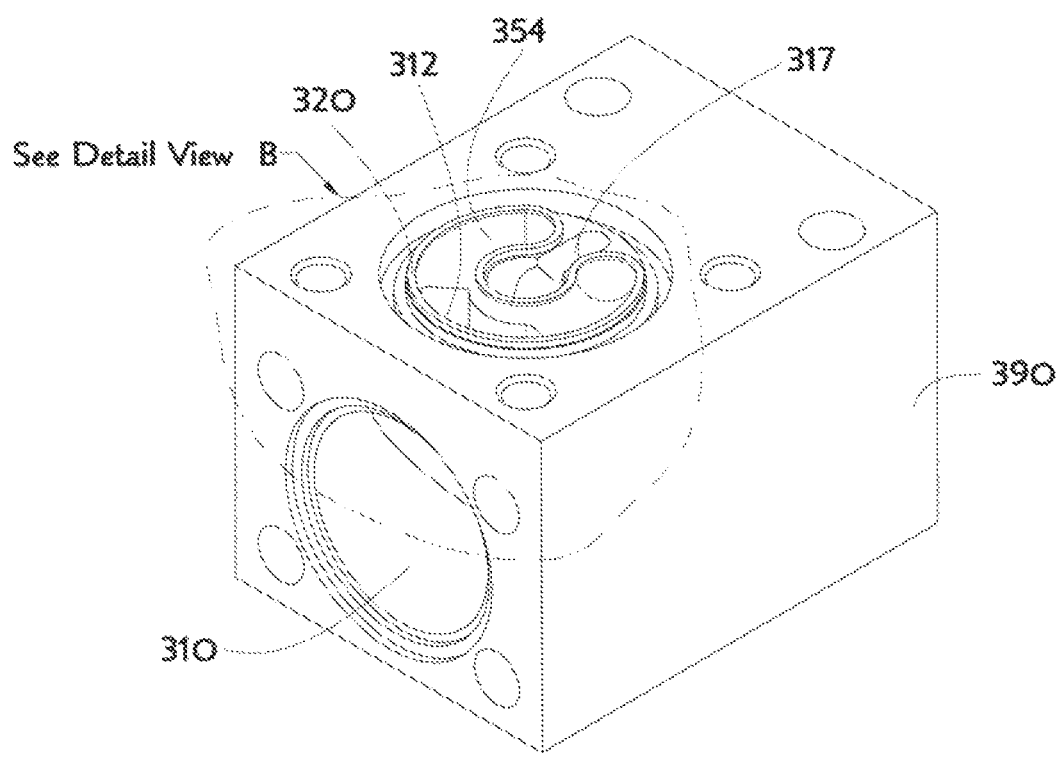
FIG. 3 illustrates a perspective view of an embodiment of the disclosed high-conductance valve.
Figure 3A:
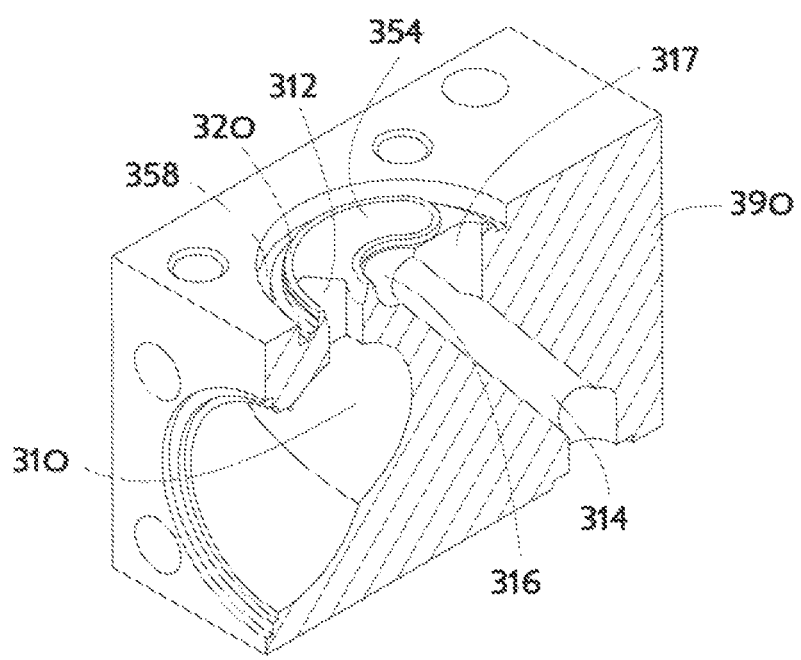
FIG. 3A illustrates a cross-sectioned perspective view of the valve body shown in FIG. 3 revealing details of the valve chamber structures.
Figure 3B:
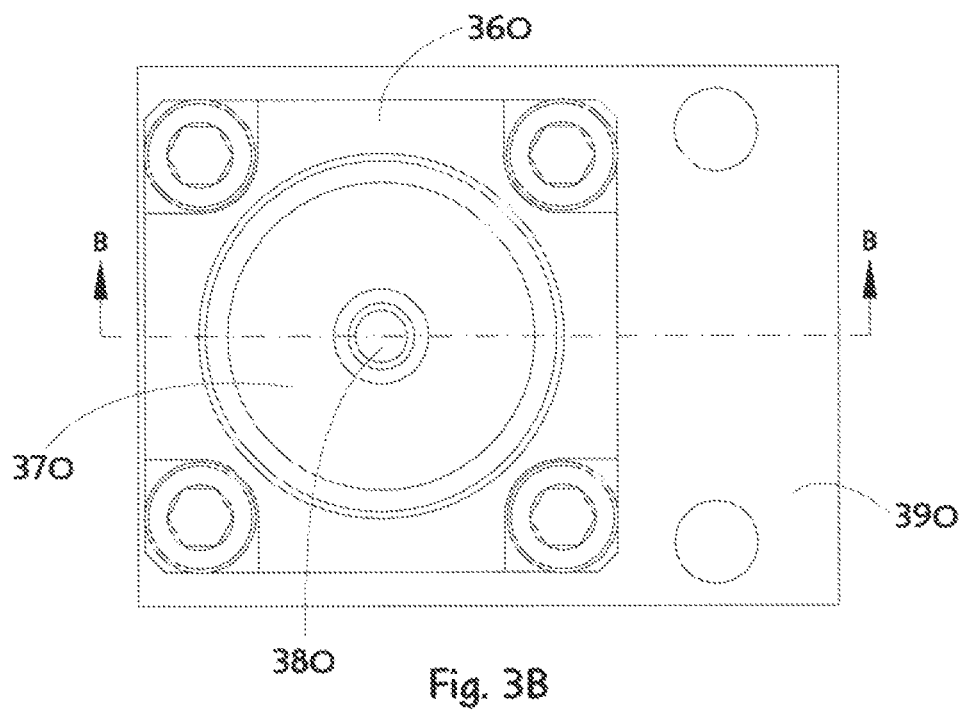
FIG. 3B illustrates a plan view of the valve shown in FIG. 3 with an attached control element.
Figure 3C:
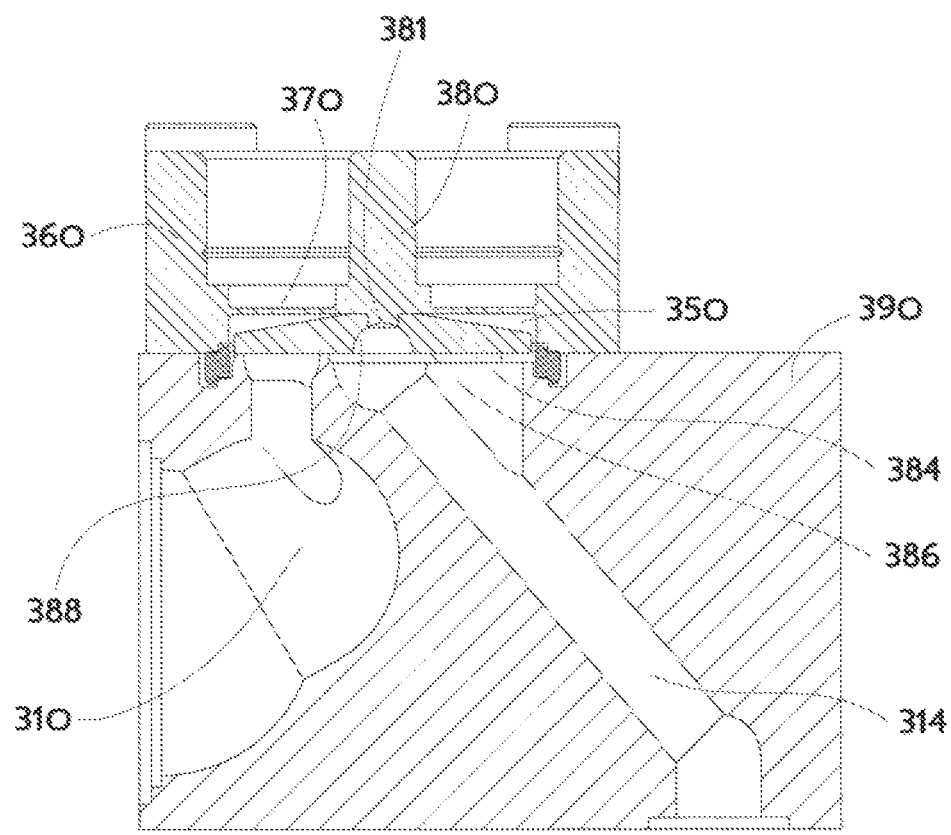
FIG. 3C illustrates a cross-sectioned view of the fluid enclosing portion of the valve of FIG. 3B.
Figure 3D:
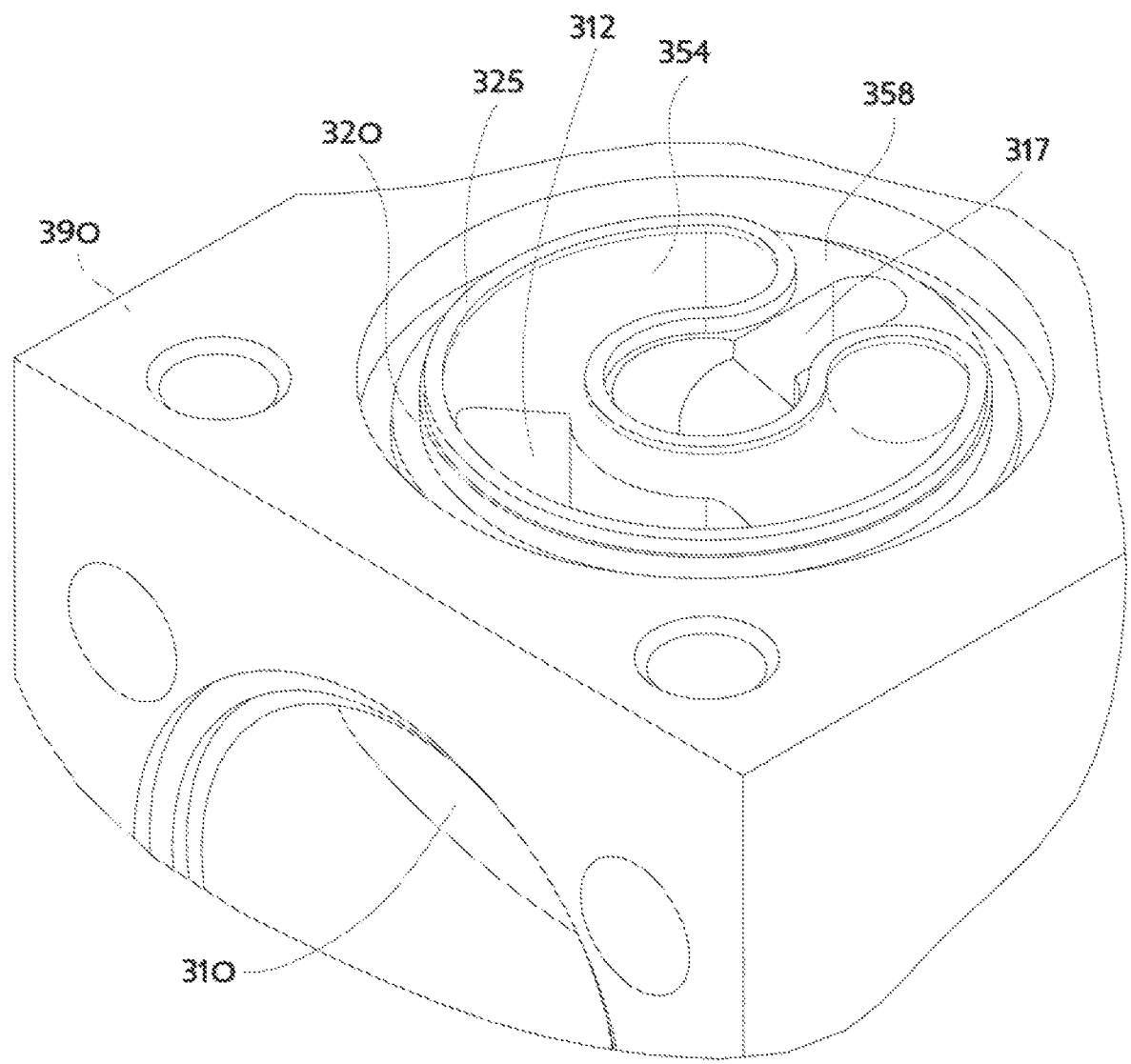
FIG. 3D is an enlarged view of FIG. 3A showing the orifice ridge and other features.
Figure 3E:
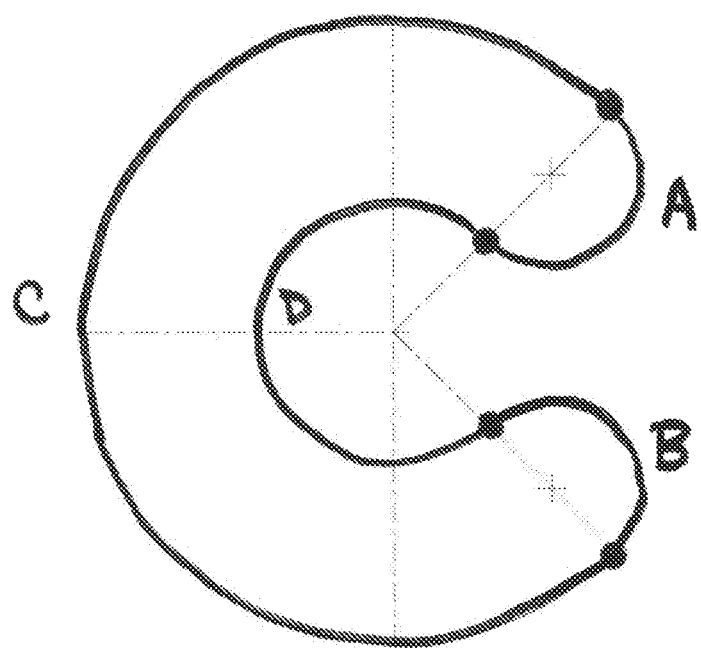
FIG. 3E is a plan view drawing showing a representative orifice ridge of the valve shown in FIG. 3.

One method of using an actuator with the usual design valve 100 is shown in FIGS. 2 and 2A which includes an interlace lifting mechanism 220, as disclosed in U.S. patent application Ser. No. 14/477,573 and published as US2015/0059877, coupling a piezoelectric actuation stack 210 to the control shaft 82. Application of an appropriate voltage to the piezoelectric stack 210 will cause stack axial extension and through the interlace lifting mechanism 220 thereby cause a motion which lifts the control element 80 away from the orifice ridge 30 allowing fluid to flow between the inlet conduit 10 and the outlet conduit 14. A skillfully used piezoelectric actuator has an overall extension ability typically limited to about fifty microns (millionths of a meter) corresponding to approximately two thousandths of an inch. It is generally understood that a valve comprised of an orifice covered by a flat control element will, upon opening, have a flow conductance (or its inverse, flow resistance) related to an effective opening area simply computed as an area defined by the periphery length (circumference) of the orifice multiplied by the control gap between the flat control element and said orifice periphery. Considering a circular orifice of diameter "D", a designer will appreciate any valve control gap "G" greater than "D/4" will have little additional conductance effect since the open area of the orifice itself will then be smaller than the corresponding effective opening area.

$$\text{orifice area} = \text{radius}^2 * pi = (D/2)^2 * pi = D*D*pi/4$$

$$gap*\text{periphery} = G*(D*pi) = (G>D/4)*D*pi > D*D*pi/4 \quad \text{Equation\_1:}$$

When G>D/4, then the flow resistance of the orifice will dominate the flow resistance of the effective opening area.

Designers may further appreciate that any valve design not able to move the control element away from a circular orifice at least one quarter of the orifice diameter will not achieve the maximum flow conductance otherwise feasible in the particular valve design. Control element translation is often substantially limited by the necessity of deforming metallic parts only in purely elastic strain. Many combinations of valve chamber sealing methods and control element translations have maximum valve flow conductance depend mostly upon the length of the orifice periphery rather than the cross section of the fluid conduits. A known approach to this design problem is to provide a circular orifice diameter substantially greater than the diameter of the associated fluid conduits. U.S. Pat. No. 4,964,423 issued to Theodore J. Gausman, et al., shows a check valve having limited control element translation and a circular orifice diameter approximately three times the diameter of the inlet and outlet fluid passages. U.S. Pat. No. 4,977,916 issued to Tadahiro Ohmi, et al., shows a diaphragm sealed valve with piezoelectric actuator and a circular orifice described in the specification as "an enlarged bell mouth annular rimmed valve port that is larger than the fluid passage."

Applicant has devised a valve design which addresses many of the forgoing problems as illustrated in FIGS. 3, 3A, 3B, 3C, 3D, and 3E. An exemplary valve design comprises a valve body 390, a first fluid conduit 310 (typically an inlet), a second fluid conduit 314 (typically an outlet), both of which communicate fluid to a valve chamber 350, a valve housing 360 which includes a valve chamber sealing diaphragm 370, and a control element 380 moveable by deflection of the valve chamber sealing diaphragm 370. A shank 381 may project from the sealing diaphragm 370 into the valve chamber 350 approximately centered on the axis of the control element 380. A control plate 384 with a central thru-hole having a recessed opening 388 may be affixed to the shank 381 by deforming the end of the shank 381 within the recessed opening 388. Actuator force applied to the control element 380 will move the control plate 384 to provide valve function as further explained below.

Designers of valves for high purity applications generally are aware of many different approaches to providing a leak tight valve chamber sealing diaphragm. In U.S. Pat. No. 4,606,374 issued to Kolenc et al., a diaphragm comprised of three sheet metal discs is peripherally clamped between stepped structures in a valve body and a valve bonnet. In U.S. Pat. No. 5,145,147 issued to Nakazawa et al., a single layer sheet metal diaphragm is welded to a portion of a valve assembly. In U.S. Pat. No. 5,755,428 issued to Ollivier, a diaphragm is statically sealed against a valve body by a clamping member forcing the diaphragm against a toroidal-shaped projection on the valve body. The instant invention illustrates a sealing diaphragm 370 machined as an integral element of a valve housing 360. For convenience all Figures in this disclosure show a similar integrally machined valve sealing diaphragm, but it should be appreciated other combinations of diaphragm and valve housing, or valve body, elements can be used with the present invention and the integral diaphragm should not be construed as limiting.

Instead of a circular orifice, applicant has devised a non-circular orifice ridge 320 structure separating the valve chamber 350 into an inner cavity 354 and an outer cavity 358. The orifice ridge 320 may be formed as a closed non-circular circuit comprising a plurality of interconnected segments surrounding an inner fluid conduit opening 312 in a path of changing curvature. According to various aspects, the plurality of interconnected segments includes at least one segment that curves away from the fluid conduit opening. According to other aspects, the plurality of segments may further include at least one segment that curves toward the fluid conduit opening. According to other aspects, at least one segment that curves away from the fluid conduit opening is adjacent to a segment that curves toward the fluid conduit opening. As used herein, a curved segment includes any segment in which all points along the curved segment have the same radius of curvature or at least one inflection point. For example, referring to FIG. 3E, the orifice ridge structure is shaped like a kidney, and includes four curved segments, A, B, C, and D. In certain instances, at least one segment may be linear, i.e., straight. The exemplary orifice ridge 320 shape may be considered to be like a kidney shape. Put another way, the kidney shape of the orifice ridge 320 may be characterized as having three segments that curve toward the inner fluid conduit opening 312 and one segment that curves away from the inner fluid conduit opening 312. For instance, referring back to FIG. 3E, segments A, B, and C all curve toward the fluid conduit opening and segment D curves away from the fluid conduit opening. Designers will appreciate the illustrated exemplary orifice ridge 320 is comprised of interconnected curved segments forming the entire shape with no straight segments anywhere. The inner fluid conduit opening 312 provides fluid communication between the inner cavity 354 and the first fluid conduit 310. An outer fluid conduit opening 316 may provide fluid communication between the outer cavity 358 and the second fluid conduit 314. The outer fluid conduit opening 316 may be disposed external to the orifice ridge 320.

The parts comprising said valve may be constructed from materials chosen for desired chemical inertness relative to the fluids to be handled and may include, for example, stainless steels, Monel® metals, titanium alloys, Hastelloy® nickel alloys, Elgiloy® cobalt alloy, copper alloys, aluminum alloys, or polymers such as Teflon®, Kel-F®, Vespel®, Kynar®, and combinations of metals and polymers either separate or together. For example, a type 316L stainless steel valve body 390 may be used with a Hastelloy® nickel alloy control plate 384. The valve body 390 with the orifice ridge 320 can be made by typical manufacturing processes such as milling, or casting, or injection molding, or recently developed additive manufacturing processes such as laser sintering (3D printing), for example. The valve body regions contacted by the controlled fluid may be subjected to additional processes, such as polishing and passivation, as is known in the art of high-purity fluid delivery.

The potential flow restricting effects of the fluid conduit openings 312, 316 may be lessened by enlarging the openings relative to the cross-sectional area of the corresponding fluid conduits 310, 314. Exemplary beneficial opening modifications may comprise an arcuate slot as illustrated in the inner fluid conduit opening 312, or a radial slot 317 as illustrated in the outer fluid conduit opening 316, or blended constructions of these and other shaping such as flaring and beveling. Skilled designers will further appreciate a plurality of fluid conduit openings may be formed within the inner cavity 354, or formed within the outer cavity 358, or both, so as to provide fluid communication between a cavity and a corresponding plurality of fluid conduits formed in a valve body (see for example, FIG. 21 & FIG. 22 of U.S. Pat. No. 5,992,463 issued to the present inventor Kim Ngoc Vu).

The upper topmost portion of the orifice ridge 320 may be made very flat, planar and smooth by lapping, or similar manufacturing process, and that surface is herein referred to as a contact track 325 of the orifice ridge 320. A control plate 384 having suitable likewise substantially planar control surface 386 of sufficient extent (typically a diameter) may rest against (make contact with) the entire contact track 325 to effectively close off all flow through the valve body 390. The valve effective opening area which is computed as an area defined by the periphery length of the orifice ridge 320 (the planar length of the contact track 325) multiplied by any control gap between the planar control surface 386 and the contact track 325, may be advantageously enlarged by the disclosed design. The length of the periphery of the non-circular orifice ridge 320 may be made substantially greater than the circumference of a simple circular orifice occupying the same space by including curved segments bending both toward and away from the inner fluid conduit opening 312.

A reasonable baseline comparison of the disclosed valve design (see FIG. 3E) may be figured in the context of a circular valve chamber sealing diaphragm 370. The kidney-like orifice ridge 320 shape shown in FIGS. 3, 3A. 3D, and 3E provides approximately 45% more periphery length than a circular orifice of identical maximum dimension (diameter).

$$\text{kidney\_perimeter} = 2.4646\_\text{inch};$$
$$\text{circle\_perimeter} = pi * D = pi * (0.54) = 1.696\_\text{inch}$$
$$2.4646/1.6965 = 1.4528. \quad \text{Equation\_2:}$$

If the comparison circular orifice surrounds an area equal to the enclosed planar area of the inner cavity 354, then the increased valve effective opening area increase is a more dramatic 74%.

$$\text{kidney\_area} = 0.160259\_\text{inch}^2; \text{ circle\_area} = pi*(D/2)$$
$$^2 - \to D = 0.4517\_\text{inch};$$
$$\text{circle\_perimeter} = pi*D = pi*(0.4517)$$
$$= 1.4191\_\text{inch}; 2.4646/1.4191 = 1.7367. \quad \text{Equation\_3:}$$

While the valve effective opening area (gap*periphery=opening area) has been substantially increased by use of the non-circular closed circuit shape for the orifice ridge 320, the planar area of the space actually enclosed as the inner cavity 354 is substantially less (approximately 66% less) than would be the case of a similarly sized circular orifice.

$$\text{kidney\_perimeter} = 2.4646\_\text{inch \&}$$
$$\text{kidney\_area} = 0.160259\_\text{inch}^2;$$
$$2.4646\_\text{inch} = \text{circle\_perimeter} = pi*D \to D = 0.7845\_\text{inch};$$
$$\text{circle\_area} = pi*(D/2)^2 = pi*(0.7845/2)$$
$$^2 = 0.483374\_\text{inch}^2; 0.160259/$$
$$0.483374 = 0.3315. \quad \text{Equation\_4:}$$

The reduced planar area corresponding to the inner cavity 354 beneficially reduces the force needed to close the control plate 384 against the orifice ridge 320 when resisting pressurized fluid flowing from the first fluid conduit 310 toward the second fluid conduit 314. In this exemplary design the orifice ridge is approximately 0.025" (0.6 mm) high, and the contact track is approximately 0.025" (0.6 mm) wide, thus mimicking the structure of the design valve illustrated in FIGS. 1 and 1A.

Figure 4A:
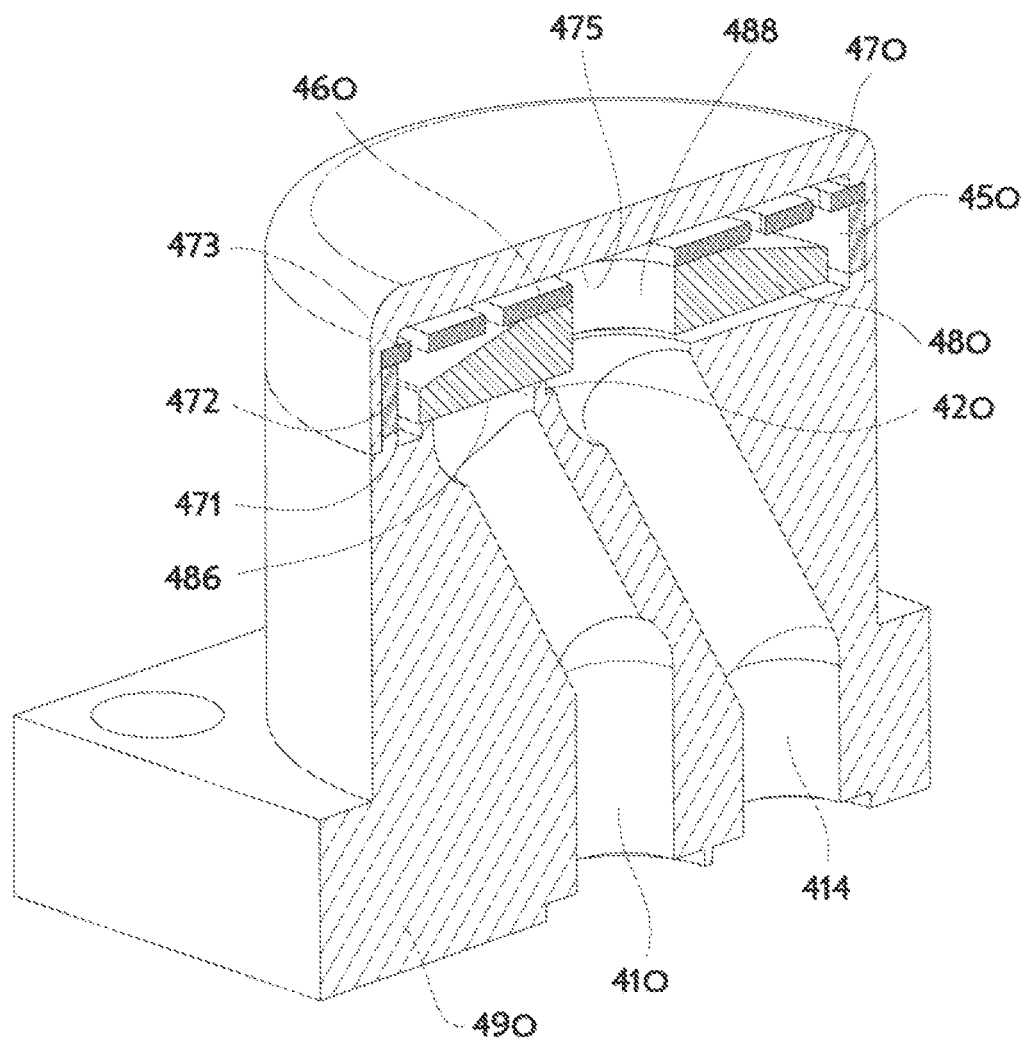
FIG. 4A illustrates a cross-sectioned perspective view of a check valve embodiment of the disclosed high-conductance valve.
Figure 4B:
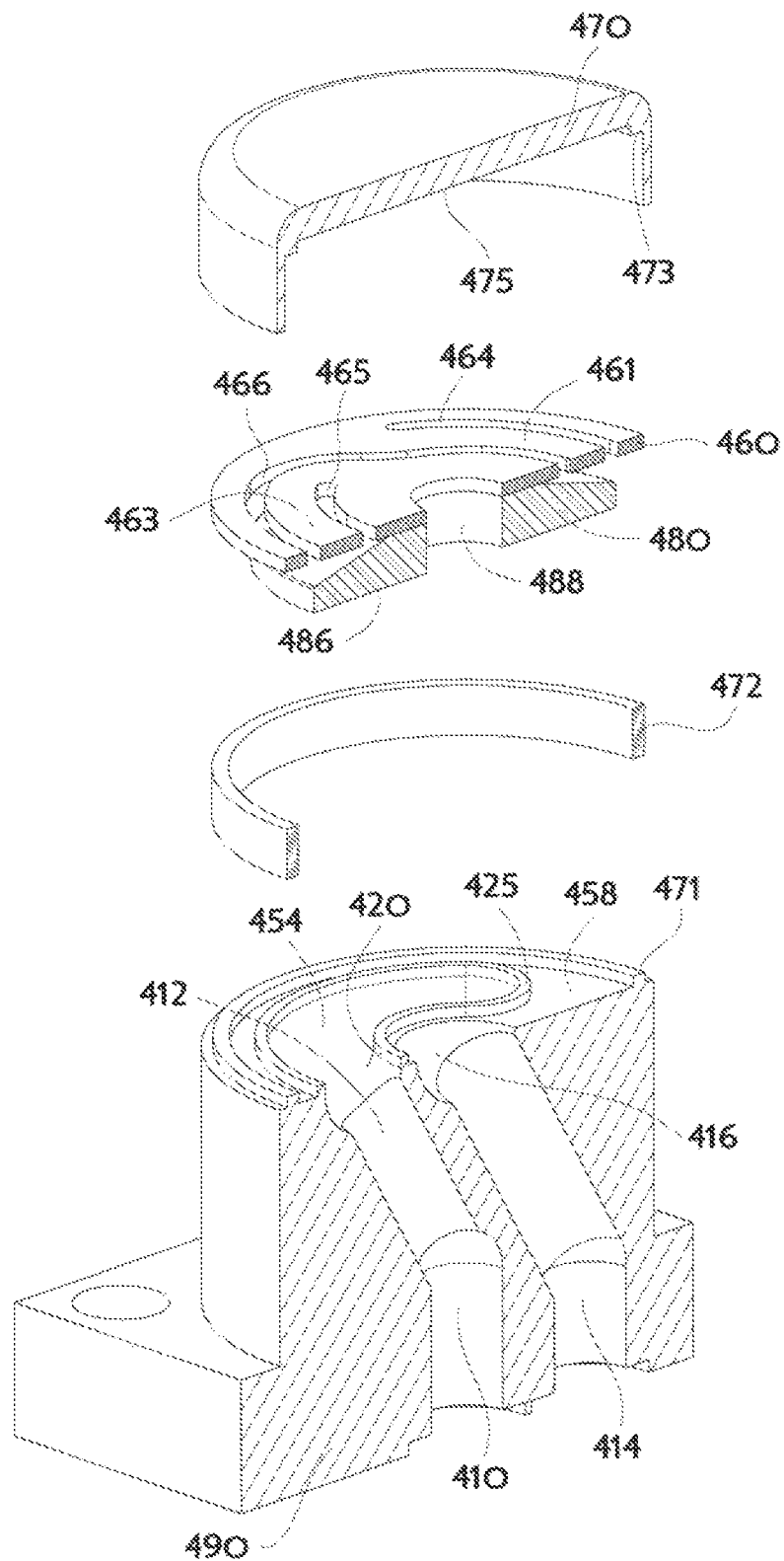
FIG. 4B is an exploded view of FIG. 4A.
Figure 4C:
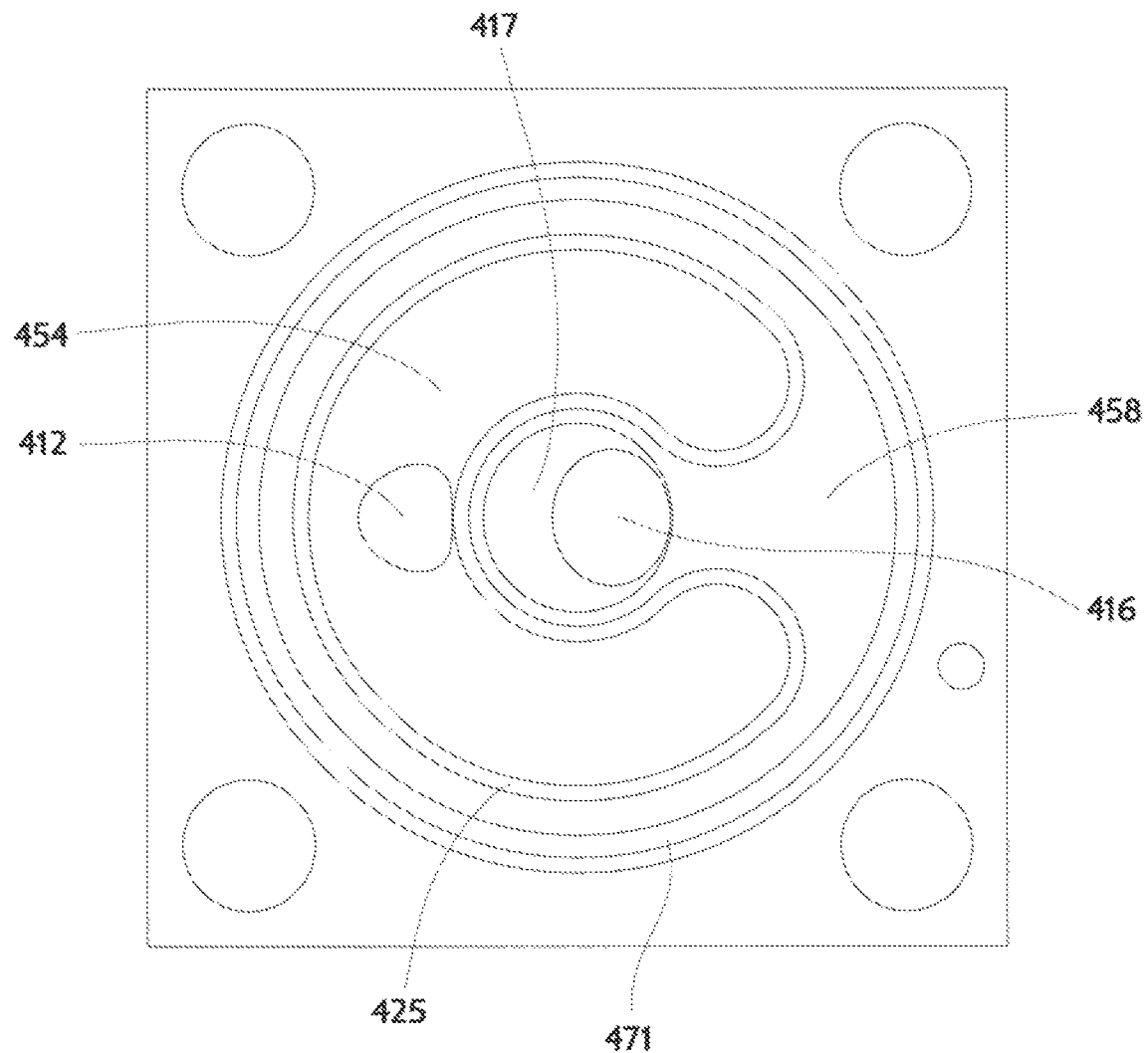
FIG. 4C illustrates a plan view of the valve body shown in FIG. 4A & FIG. 4B.

Another exemplary valve design illustrated in FIG. 4A, FIG. 4B, & FIG. 4C comprises a valve body 490, a first fluid conduit 410 (an inlet), a second fluid conduit 414 (an outlet), both of which conduits communicate fluid to a valve chamber 450, a cup-shaped valve chamber sealing lid 470, also referred to herein as a valve chamber sealing cap, and a control plate 480 moveable by deflection of a disk spring 460. The control plate 480 may be formed as a circular plate having a planar control surface 486. Instead of a circular orifice, this embodiment features a non-circular orifice ridge 420 structure separating the valve chamber 450 into an inner cavity 454 and an outer cavity 458. The orifice ridge 420 may be formed as a closed non-circular circuit comprising a plurality of interconnected segments surrounding an inner fluid conduit opening 412 in a path of changing curvature. Similar to the orifice ridge discussed above in reference to FIGS. 3, 3A, 3B, 3C, 3D, and 3E, the plurality of interconnected segments may include at least one segment that curves away from the fluid conduit opening, and in certain instances may include at least one segment that curves toward the fluid conduit opening, and in other instances a segment that curves away from the fluid conduit opening may be adjacent to a segment that curves toward the fluid conduit opening. As discussed above with reference to the orifice ridge 320, the kidney shape of the orifice ridge 420 may include three segments that curve toward the fluid conduit opening and one segment that curves away from the fluid conduit opening. The inner fluid conduit opening 412 provides fluid communication between the inner cavity 454 and the first fluid conduit 410. An outer fluid conduit opening 416 provides fluid communication between the outer cavity 458 and the second fluid conduit 414. The outer fluid conduit opening 416 may be disposed external to the orifice ridge 420. The parts comprising this valve may also be constructed from materials chosen for desired chemical inertness relative to the fluids to be handled and may include combinations of metals and polymers either separate or together. For example, a type 316L stainless steel valve body 490 may be used with a Kel-F® polymer control plate 480 and an Elgiloy® cobalt alloy disk spring 460, or all three items may be 300 series stainless steels.

The upper topmost portion of the orifice ridge 420 may be made very flat, planar and smooth by lapping, or similar manufacturing process, and that surface is herein referred to as a contact track 425 of the orifice ridge 420. A surrounding cap alignment ridge 471 may be prepared at the same time as the orifice ridge 420. The circular control plate 480 is of sufficient extent (typically a diameter) and having suitable likewise planar control surface 486 such that it may rest against (make contact with) the entire contact track 425 to effectively close off all flow through the valve body 490. A central hole 488 through the control plate 480 may be provided to enhance fluid communication from that portion of the valve chamber 450 which is adjacent the sealing lid inner top 475 into the outer cavity 458. The control plate 480 is radially positioned and axially positioned by a disk spring 460 of known design having multiple arcuate arms 461, 462, 463 defined by slots 464, 465, 466 in the disk spring 460. The disk spring 460 may be made of material similar to that chosen for a sealing diaphragm 370 in the valve configuration discussed above in reference to FIGS. 3, 3A, 3B, 3C, 3D, and 3E. The control plate 480 may be attached to the disk spring 460 by welding, or other suitable process (such as an adhesive or staking) depending upon chosen materials, and may be axially located by a spacer ring 472. Other suitable methods of axial location, such as steps, counterbores, and such, are well known to designers. A step 473 is provided around the inner periphery of the cup-shaped sealing lid 470 to space the disk spring 460 away from the sealing lid inner top 475. The combination of spacer ring 472 in conjunction with the step 473 and alignment ridge 471 allows a single circumferential weld to hermetically attach the valve chamber sealing cap 470 to the valve body 490 while simultaneously positioning the control plate 480 for correct valve function.

In the absence of sufficient fluid pressure (the cracking pressure) within the inlet fluid conduit 410, the axial force of the disk spring 460 will hold the control surface 486 of the control plate 480 tightly against the contact track 425 of the orifice ridge 420, and thereby prevent fluid flow. If fluid pressure within the inlet conduit 410 is sufficiently higher than within the outlet conduit 414, then the control plate 480 will be pushed away from the contact track 425 of the orifice ridge 420 and fluid may flow out of the inner cavity 454 and into the outer cavity 458 and thereby through the valve body 490. In the event the pressure differential is reversed and the pressure within the outlet conduit 414 is greater than within the inlet conduit 410, then the control plate 480 will be pushed against the orifice ridge 420 and fluid flow will be blocked. Consequently this embodiment may be considered to be a check valve having the purpose of constraining fluid flow to only a preferred direction.

The potential flow restricting effects of the fluid conduit openings 412, 416 may be lessened by enlarging the openings relative to the cross-sectional area of the corresponding fluid conduits 410, 414. Exemplary beneficial opening modifications may comprise a blending and flaring as provided by a hemispherical mouth 417. Skilled designers will further appreciate a plurality of fluid conduit openings may be formed within the inner cavity, or formed within the outer cavity, or both, so as to provide fluid communication between a cavity and a corresponding plurality of fluid conduits formed in a valve body (see for example, FIG. 21 & FIG. 22 of U.S. Pat. No. 5,992,463 issued to the present inventor Kim Ngoc Vu); however, in the surface mount style check valve shown in FIGS. 4A-4C only a single inlet conduit 410 and a single outlet conduit 414 are used.

The valve effective opening area which is computed as an area defined by the periphery length of the orifice ridge 420 (the planar length of the contact track 425) multiplied by any control gap between the planar control surface 486 and the contact track 425, may be advantageously enlarged by the disclosed design. The length of the periphery of the non-circular orifice ridge 420 may be made substantially greater than the circumference of a simple circular orifice occupying a similar space by including curved segments bending both toward and away from the inner fluid conduit opening 412. The superiority of the instant high-conductance check valve design is made apparent by considering the previous Equation_2 and Equation_3, because the same orifice ridge 320, 420 shape may be used in both valves. It should be further appreciated that the valve body 490 is intended for use in surface mount fluid delivery systems, wherein fluid handling components are removably attached to flow substrates containing fluid pathway conduits, and therefore the useable size and footprint of components is limited.

Figure 5:
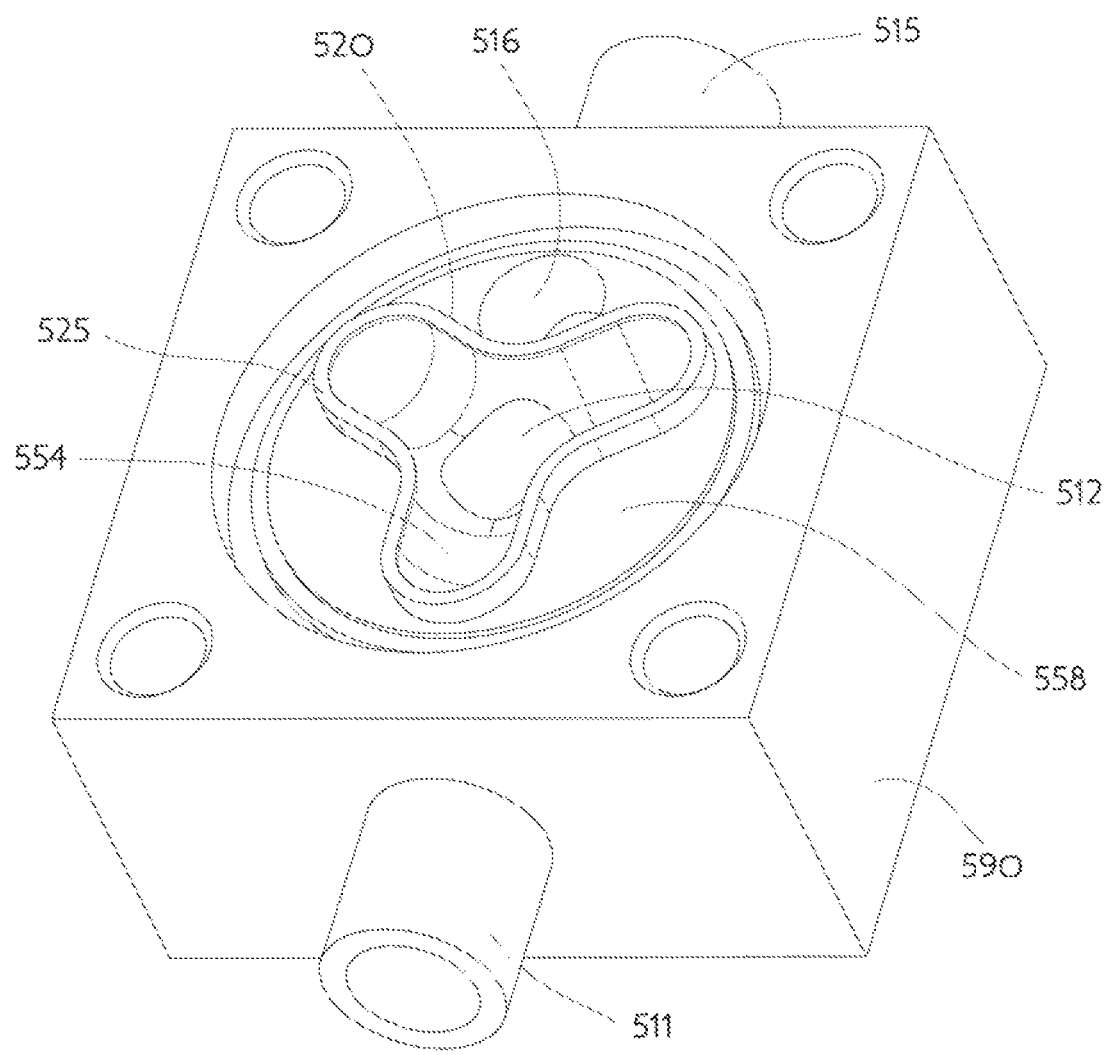
FIG. 5 illustrates a perspective view of the valve body of another embodiment of the disclosed high-conductance valve.
Figure 5A:
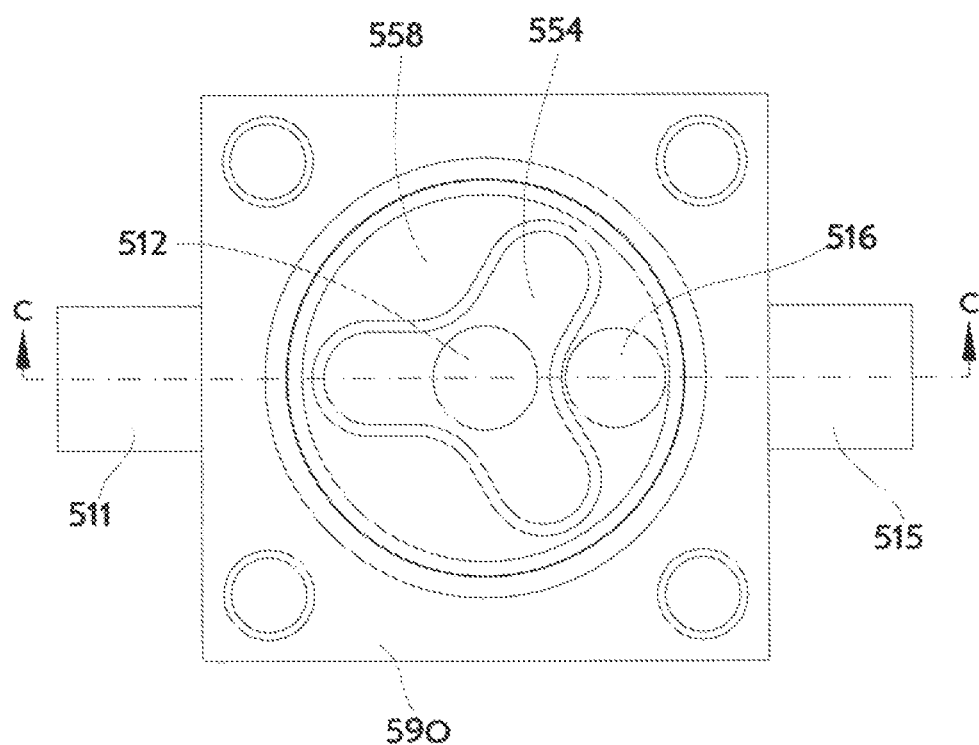
FIG. 5A illustrates a plan view of the valve shown in FIG. 5.
Figure 5B:
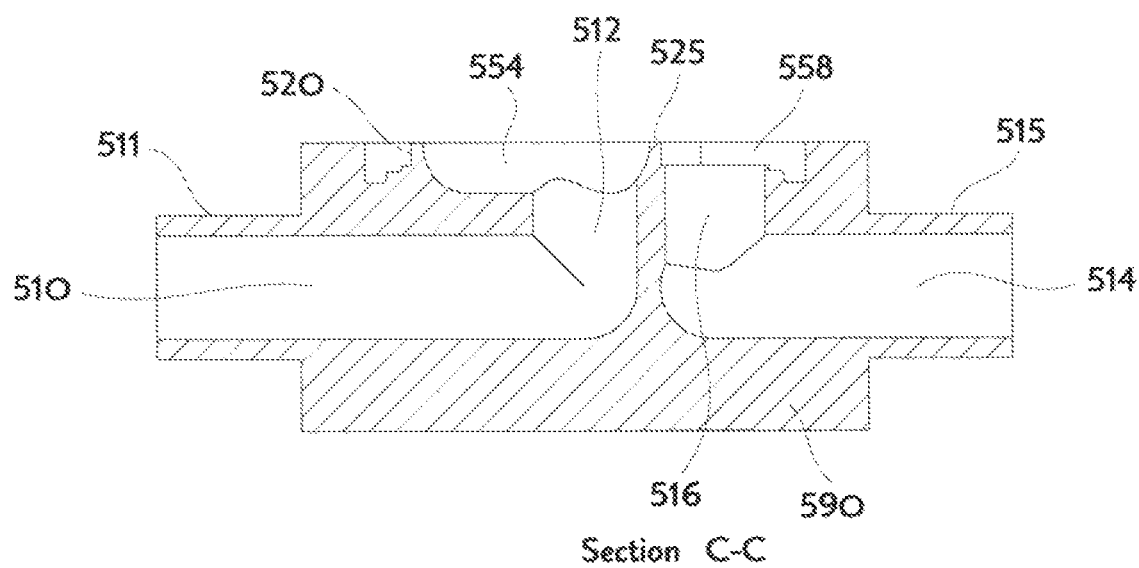
FIG. 5B illustrates a cross-sectioned elevation view of the valve body shown in FIG. 5.

Yet another exemplary valve design is illustrated in FIGS. 5, 5A, and 5B comprises a valve body 590, a first fluid conduit 510 (typically an inlet), and a second fluid conduit 514 (typically an outlet), both of which communicate fluid to a valve chamber (not shown). Details of suitable, but not shown, sealing diaphragms, control elements, and actuators may be readily appreciated from other embodiments described herein. It should also be noted that this embodiment illustrates how the disclosed valve design may alternatively be used with tubular conduit connections 511, 515 instead of being a surface mount type component in a high purity fluid delivery apparatus. Instead of a circular orifice, applicant has devised a non-circular petal-like orifice ridge 520 structure separating the valve chamber into an inner cavity 554 and an outer cavity 558. The orifice ridge 520 may be formed as a closed non-circular circuit comprising a plurality of interconnected segments surrounding an inner fluid conduit opening 512 in a path of changing curvature. According to certain aspects, the plurality of interconnected segments that form the orifice ridge 520 may include at least one segment that curves away from the fluid conduit opening and at least one segment that curves toward the fluid conduit opening. According to a further aspect, at least one segment that curves away from the fluid conduit opening is adjacent to at least one segment that curves toward the fluid conduit opening. The exemplary orifice ridge 520 shape may be considered like petals of a flower in so far as said shape includes an equal number of segments that curve toward and away from the inner fluid conduit opening 512. The inner fluid conduit opening 512 provides fluid communication between the inner cavity 554 and the first fluid conduit 510. An outer fluid conduit opening 516 may provide fluid communication between the outer cavity 558 and the second fluid conduit 514. The outer fluid conduit opening 516 may be disposed external to the orifice ridge 520. The parts comprising said valve may be constructed from materials chosen for desired chemical inertness relative to the fluids to be handled and may include combinations of metals and polymers either separate or together. For example, a type 316L stainless steel valve body 590 may be used with a Kel-F® polymer control plate (not shown) and an Elgiloy® cobalt alloy sealing diaphragm (also not shown). Skilled designers will further appreciate a plurality of fluid conduit openings may be formed within the inner cavity 554, or formed within the outer cavity 558, or both, so as to provide fluid communication between a cavity and a corresponding plurality of fluid conduits formed in a valve body (see for example, FIG. 21 & FIG. 22 of U.S. Pat. No. 5,992,463 issued to the present inventor Kim Ngoc Vu), especially for purposes of providing a flow division functionality.

The upper topmost portion of the orifice ridge 520 may be made very flat, planar and smooth by lapping, or similar manufacturing process, and that surface is herein referred to as a contact track 525 of the orifice ridge 520. A control plate (not shown) having suitable likewise planar control surface (not shown) of sufficient extent (typically a diameter) may rest against (make contact with) the entire contact track 525 to effectively close off all flow through the valve body 590. The valve effective opening area, which is computed as an area defined by the periphery length of the orifice ridge 520 (the planar length of the contact track 525) multiplied by any control gap between the planar control surface 586 and the contact track 525, may be advantageously enlarged by the disclosed design. The length of the non-circular petal-like orifice ridge 520 periphery may be made substantially greater than the circumference of a simple circular orifice occupying similar space by including curved segments bending both inwardly and outwardly around the inner fluid conduit opening 512, thereby forming the described petal-like loops. The perimeter of the exemplary design having three petal-like loops is about 35% greater than a round orifice enclosing an identical area. Skilled designers will appreciate that greater than or less than three loops may also be constructed particularly when considering flow dividing valve structures.

Figure 6:
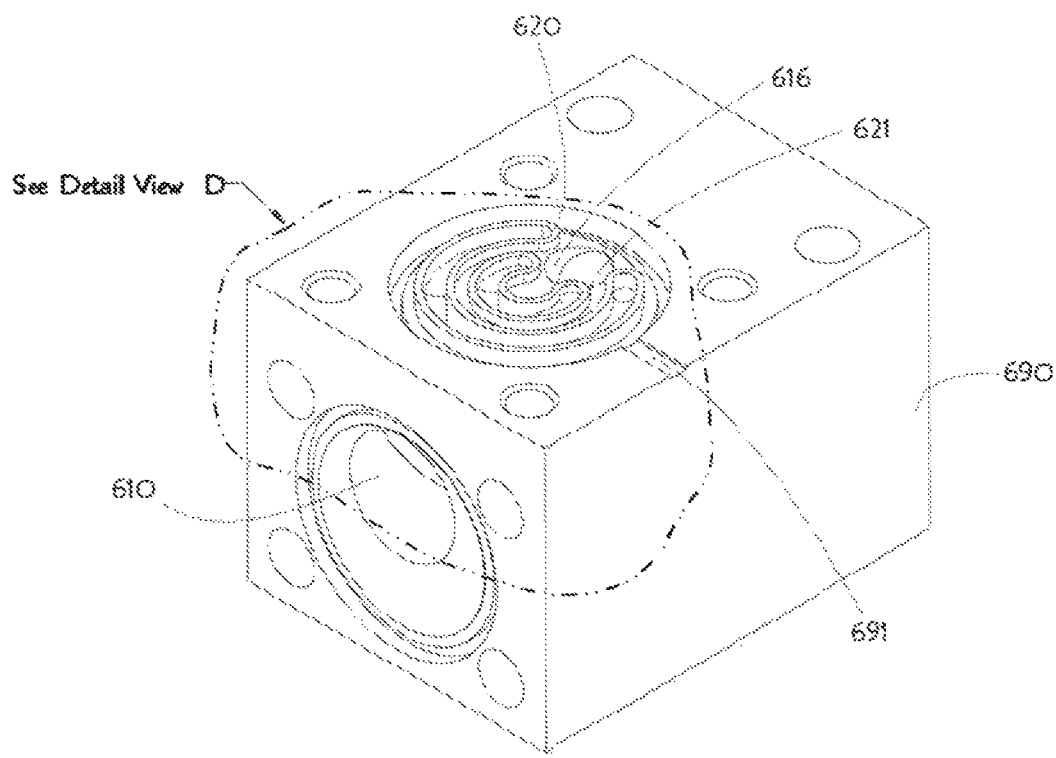
FIG. 6 illustrates a perspective view of the valve body of another embodiment of the disclosed high-conductance valve comprising two orifice ridge structures.
Figure 6A:
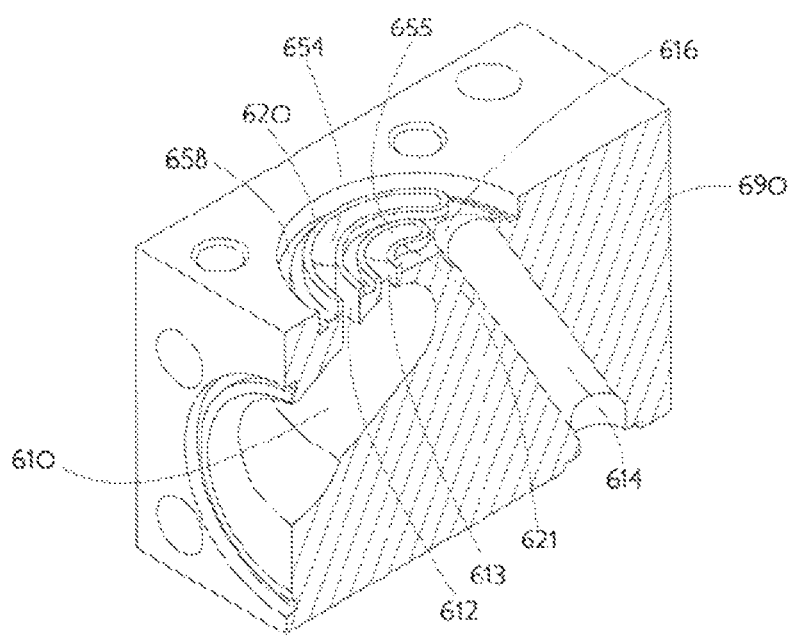
FIG. 6A illustrates a cross-sectioned perspective view of the valve body shown in FIG. 6 revealing details of the valve chamber structures.
Figure 6B:
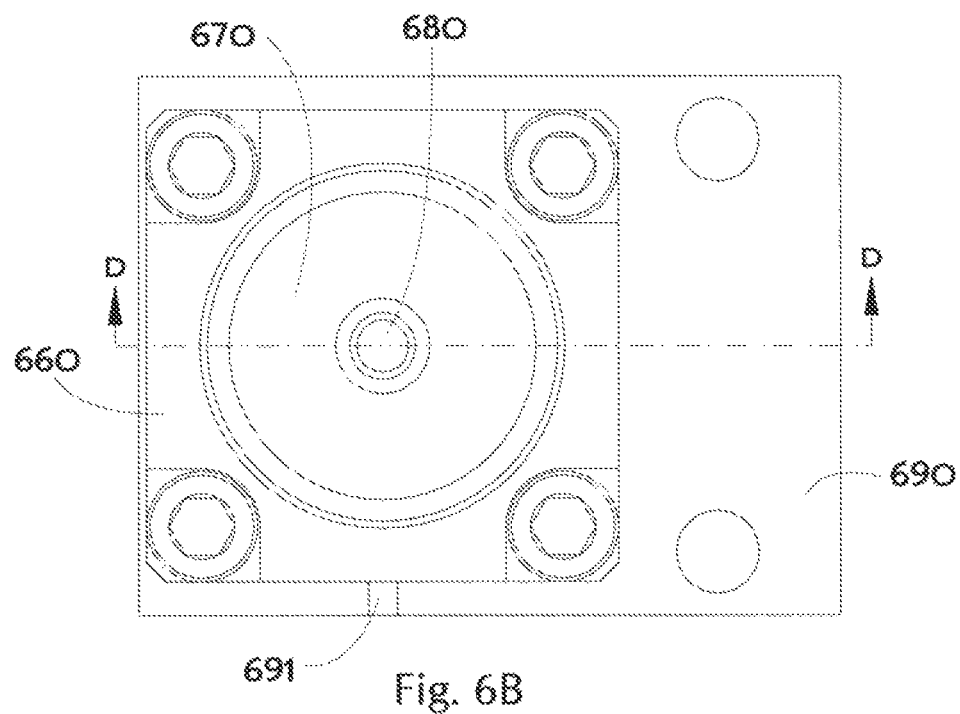
FIG. 6B is a plan view of the valve shown in FIG. 6 with an attached control element.
Figure 6C:
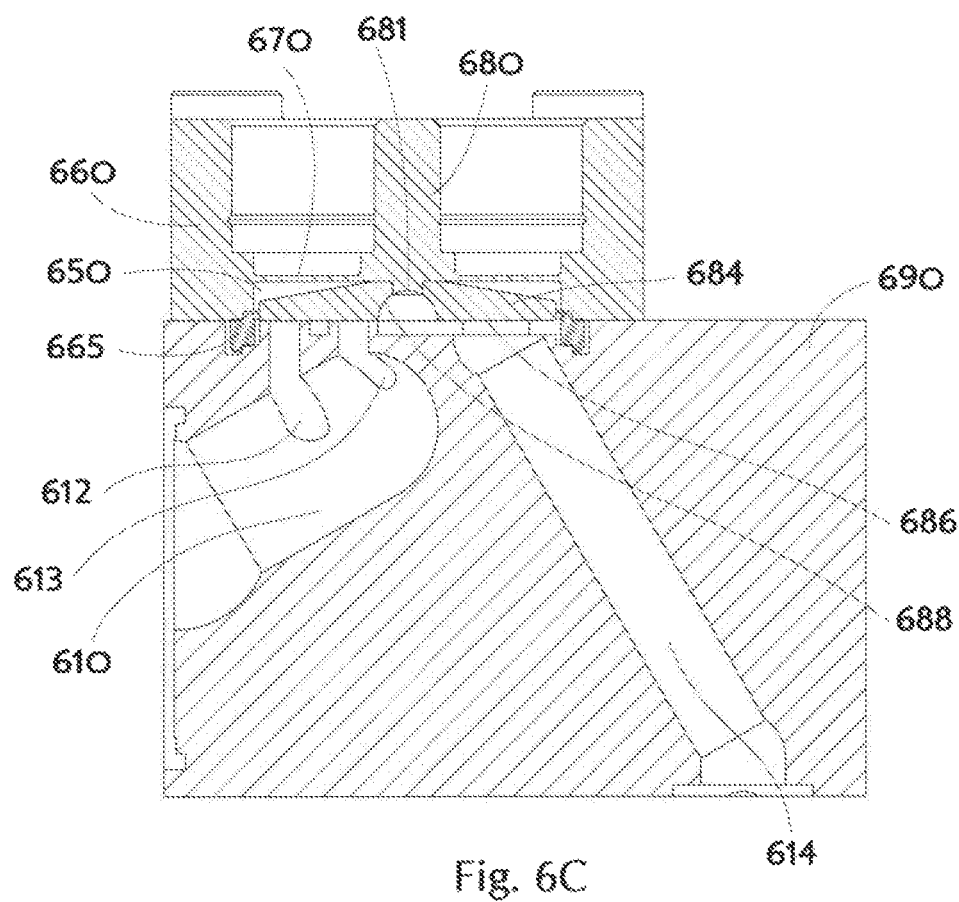
FIG. 6C illustrates a cross-sectioned view of the fluid enclosing portion the valve shown in FIG. 6B.
Figure 6D:
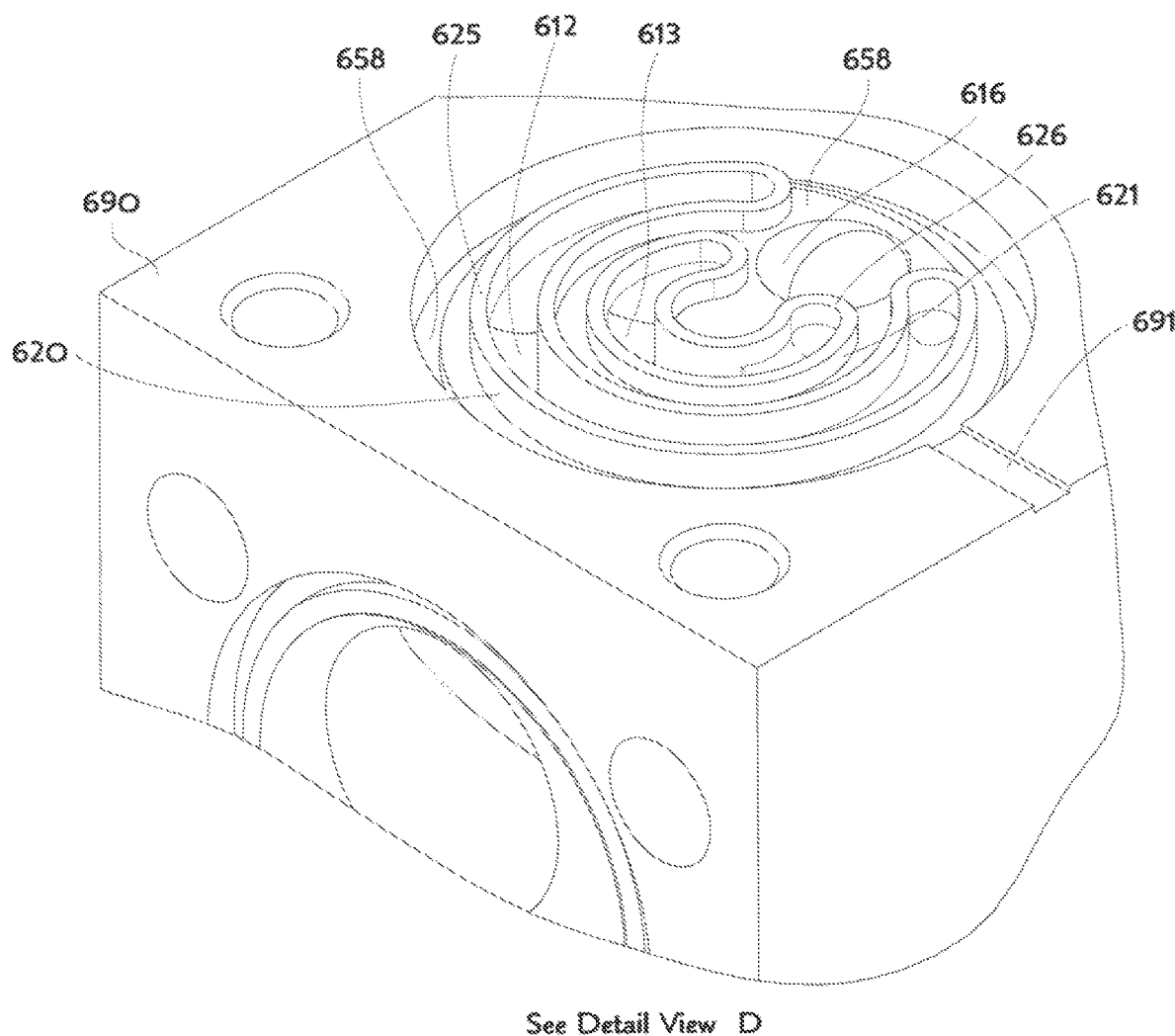
FIG. 6D is an enlarged view of FIG. 6A showing the orifice ridges and other features.

Another exemplary valve design is illustrated in FIGS. 6, 6A, 6B. 6C, and 6D comprises a valve body 690, a first fluid conduit 610 (typically an inlet), a second fluid conduit 614 (typically an outlet), both of which conduits communicate fluid to a valve chamber 650, a valve housing 660 which includes a valve chamber sealing diaphragm 670, and a control element 680 moveable by deflection of the valve chamber sealing diaphragm 670. A shank 681 may project from the sealing diaphragm 670 into the valve chamber 650 approximately centered on the axis of the control element 680. A control plate 684 with a central thru-hole having a recessed opening 688 may be affixed to the shank 681 by deforming the end of the shank 681 within the recessed opening 688. Actuator force applied to the control element 680 will move the control plate 684 to provide valve function as further explained below. A leak test groove 691 may be provided in the face of the valve body 690 to assist testing integrity of the seal 665 between the valve body 690 and the valve housing 660 which includes the diaphragm 670.

Instead of a circular orifice, applicant has devised a first non-circular orifice ridge 620 structure separating a first inner cavity 654 from an outer cavity 658 of the valve chamber 650. The first orifice ridge 620 may be formed as a closed non-circular circuit comprising a plurality of interconnected segments surrounding a first inner fluid conduit opening 612 in a path of changing curvature. Similar to the orifice ridge discussed above in reference to FIGS. 3, 3A, 3B, 3C, 3D, 3E and FIGS. 4A, 4B, and 4C, the plurality of interconnected segments may include at least one segment that curves away from the fluid conduit opening, and in certain instances may include at least one segment that curves toward the fluid conduit opening, and in other instances the segment that curves away from the fluid conduit opening is adjacent to the segment that curves toward the fluid conduit opening. As discussed above with reference to the orifice ridges 320 and 420, the kidney shape of the first orifice ridge 620 may include three segments that curve toward the fluid conduit opening and one segment that curves away from the fluid conduit opening. In this exemplary valve design, the first kidney-like orifice ridge 620 structure at least partially surrounds a second similar and smaller kidney-like second orifice ridge 621 structure. This configuration allows a second inner cavity 655 to be separated from the outer cavity 658. Thus, the second orifice ridge 621 is at least partially surrounded by the first orifice ridge 620. Designers will appreciate that any closed circuit shape may be implemented for the partially surrounded smaller second orifice ridge 621, including circular or non-circular closed circuit shapes, just as the closed circuit of the first orifice ridge 620 may be circular in shape and the closed circuit of the second orifice ridge 621 may be non-circular in shape. The illustrated kidney-like example comprises a plurality of interconnected curved segments surrounding a second inner fluid conduit opening 613. The valve body 690 with the orifice ridges 620, 621 can be made by typical manufacturing processes such as milling, or casting, or injection molding, or recently developed additive manufacturing processes such as laser sintering (3D printing), for example. The valve body regions contacted by the controlled fluid may be subjected to additional processes, such as polishing and passivation, as is known in the art of high-purity fluid delivery.

The first inner fluid conduit opening 612 provides fluid communication between the first inner cavity 654 and the first fluid conduit 610. The second inner fluid conduit opening 613 may provide fluid communication between the second inner cavity 655 and the first fluid conduit 610 (as illustrated) or a different fluid conduit (described in further detail below with respect to FIGS. 9, 9A, 9B, 9C, 9D, 9E, 9F, and 9G) according to the designer's intent (e.g. flow splitting versus high conductance). An outer fluid conduit opening 616 may provide fluid communication between the outer cavity 658 and the second fluid conduit 614. The outer fluid conduit opening 616 may be disposed external to the first orifice ridge 620 and the second orifice ridge 621. The parts comprising said valve may be constructed from materials chosen for desired chemical inertness relative to the fluids to be handled and may include, for example, stainless steels, Monel® metals, titanium alloys, Hastelloy® nickel alloys, Elgiloy® cobalt alloy, copper alloys, aluminum alloys, or polymers such as Teflon®, Kel-F®, Vespel®, Kynar®, and combinations of metals and polymers either separate or together. For example, a type 316L stainless steel valve body 690 may be used with a Hastelloy® nickel alloy control plate 684.

The potential flow restricting effects of the fluid conduit openings 612, 613, 616 may be lessened by enlarging the openings relative to the cross-sectional area of the corresponding fluid conduits 610, 614. Exemplary beneficial opening modifications may comprise an arcuate slot as illustrated in the inner fluid conduit openings 612, 613 or a blended construction of other shaping such as flaring and beveling as illustrated at the outer fluid conduit opening 616. The upper topmost portion of the first and second orifice ridges 620, 621 may be made very flat planar and smooth by lapping, or similar manufacturing process, and those coplanar surfaces are herein referred to as contact tracks 625, 626 of the first and second orifice ridges 620, 621. A control plate 684 having suitable likewise substantially planar control surface 686 of sufficient extent (typically a diameter) may rest against (make contact with) the entirety of both contact tracks 625, 626 to effectively close off all flow through the valve body 690. The valve effective opening area, which is computed as an area defined by the periphery length of the orifice ridges 620, 621 in fluid communication with the first fluid conduit 610 (the planar length of the contact tracks 625, 626) multiplied by any control gap between the planar control surface 686 and the contact tracks 625, 626, may be advantageously enlarged by the disclosed design. The length of the peripheries of the non-circular orifice ridges 620, 621 may be made substantially greater than the circumference of a simple circular orifice occupying the same space by including curved segments bending both away and toward the inner fluid conduit openings 612, 613 and nesting multiple orifice ridge shapes. Described another way, the second orifice ridge 621 may be spaced apart from and at least partially surrounded by the first orifice ridge 620. According to other embodiments, i.e., FIGS. 8, 8A, 8B, 8C, 8D, 8E, and 8F, the second orifice ridge may be completely surrounded by the first orifice ridge.

Figure 7:
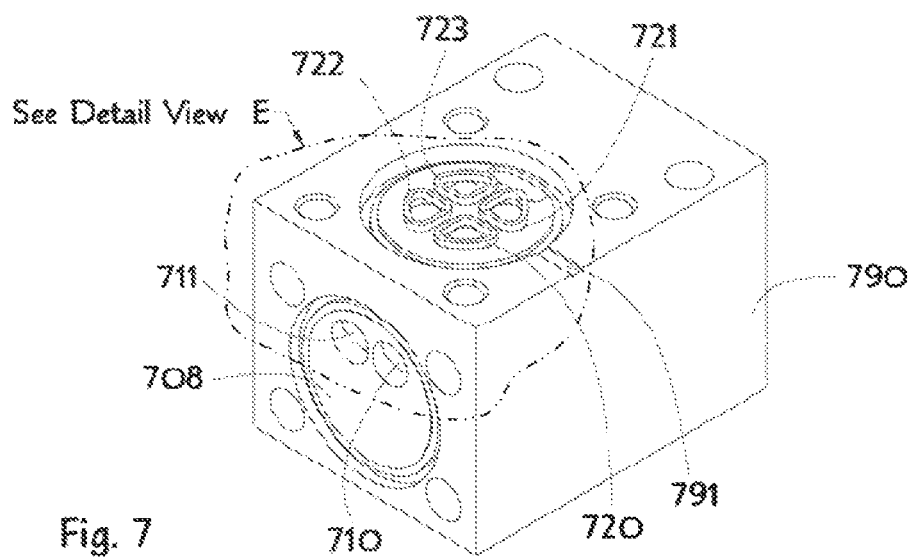
FIG. 7 illustrates a perspective view of an embodiment of the disclosed high-conductance valve comprising a plurality of non-circular orifice ridge shapes.
Figure 7A:
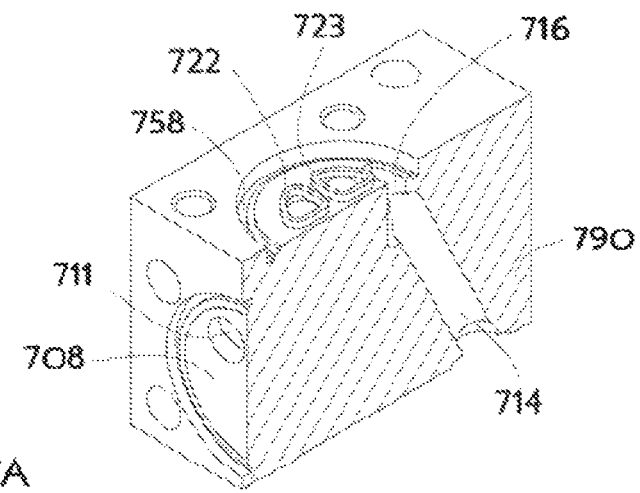
FIG. 7A illustrates a first cross-sectioned perspective view of the fluid enclosing portion of the valve shown in FIG. 7.
Figure 7B:
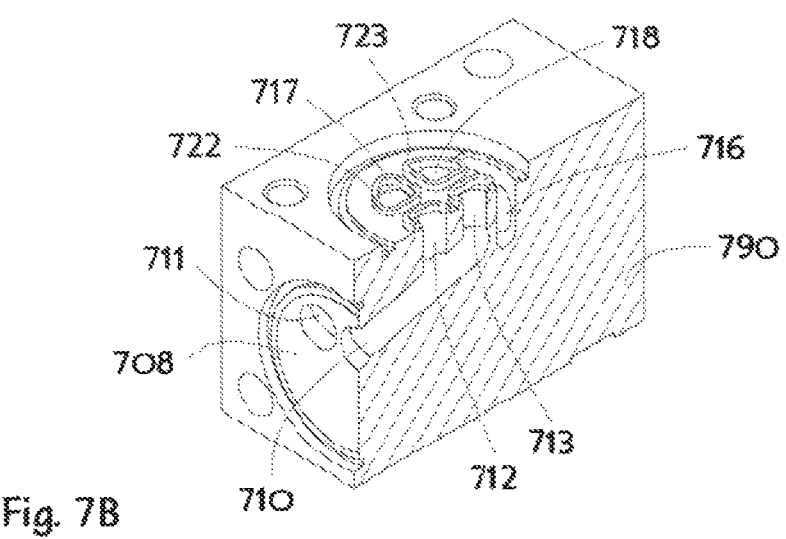
FIG. 7B illustrates a second cross-sectioned perspective view of the valve body shown in FIG. 7 revealing details of the valve chamber structures.
Figure 7C:
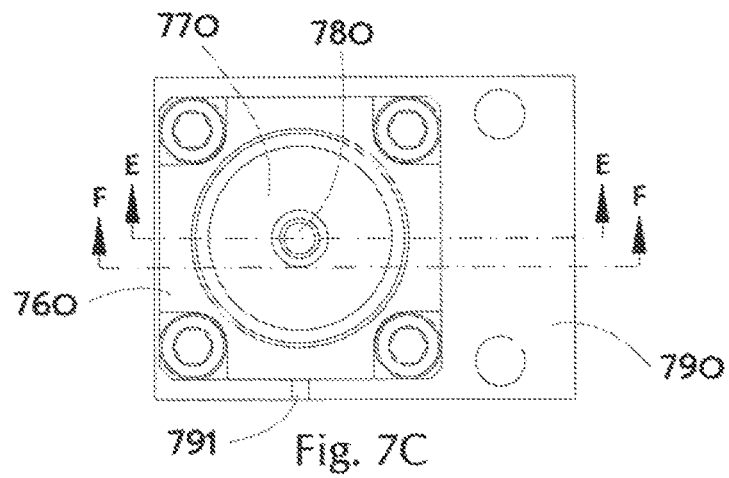
FIG. 7C illustrates a plan view of the valve shown in FIG. 7 with an attached control element.
Figure 7D:
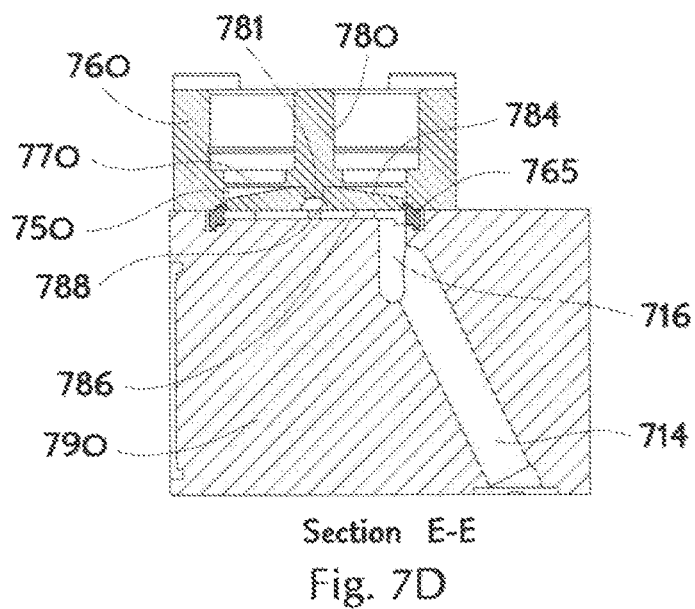
FIG. 7D illustrates a first cross-sectioned view of the valve shown in FIG. 7C.
Figure 7E:
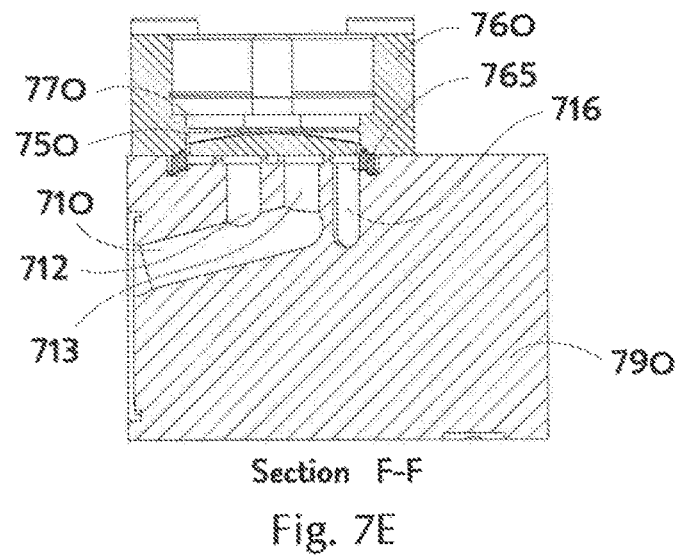
FIG. 7E illustrates a second cross-sectioned view of the valve shown in FIG. 7C.
Figure 7F:
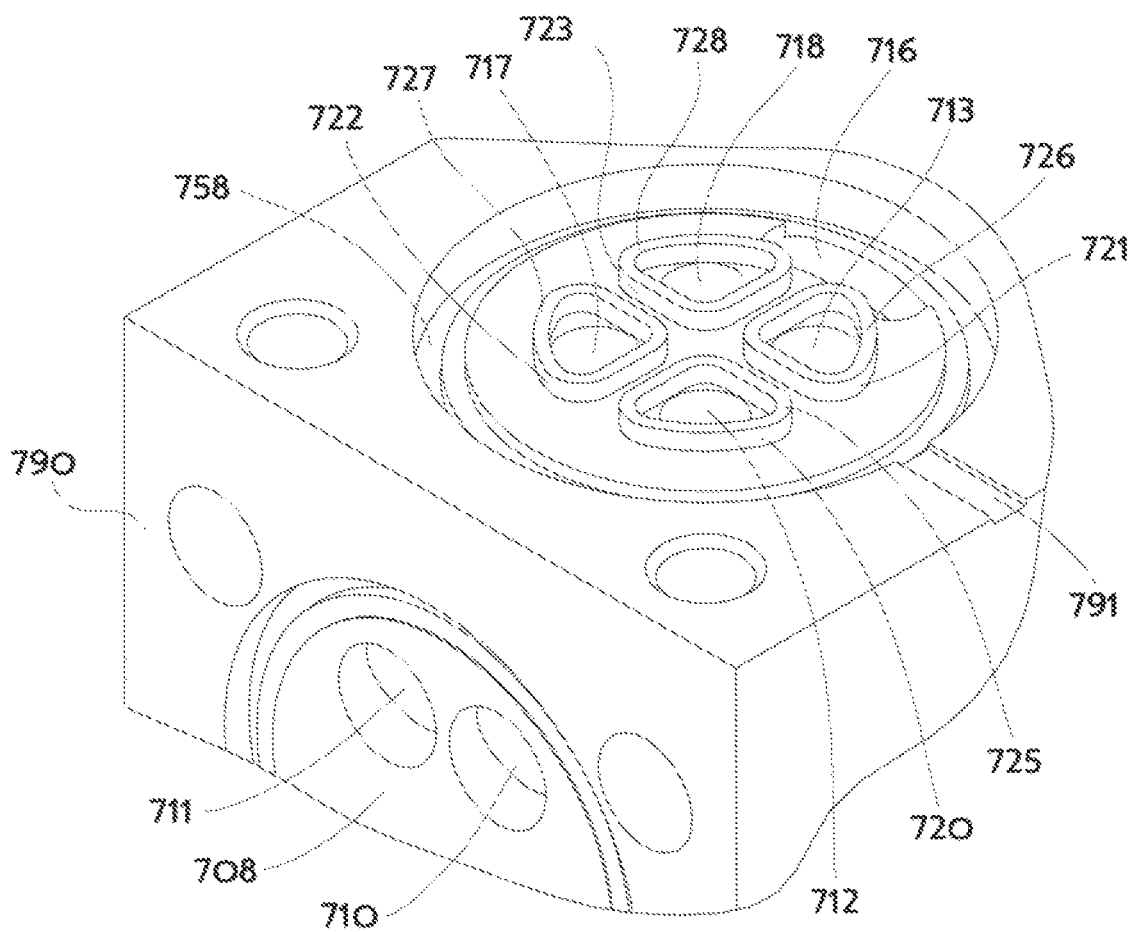
FIG. 7F is an enlarged view of FIG. 7B showing the plurality of non-circular orifice ridge shapes and other features.
Figure 8:
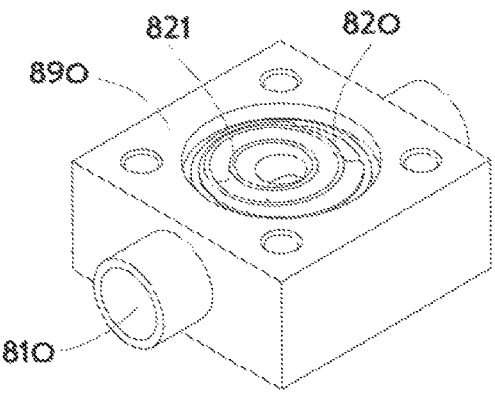
FIG. 8 illustrates a perspective view of an embodiment of the high-conductance valve comprising a first orifice ridge completely surrounding a second orifice ridge.
Figure 8B:
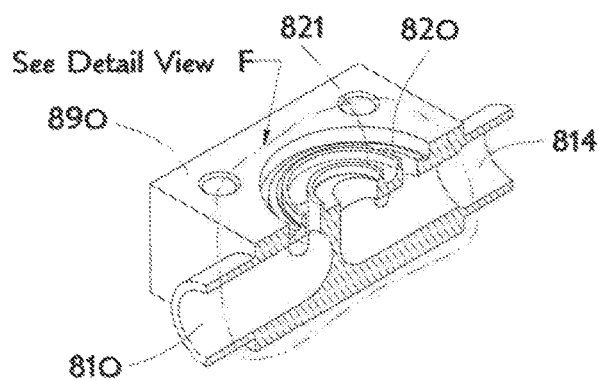
FIG. 8B is a cross-sectioned perspective view of the valve body shown in FIG. 8 revealing details of the valve chamber structure and the first orifice ridge surrounding the second orifice ridge.
Figure 8A:
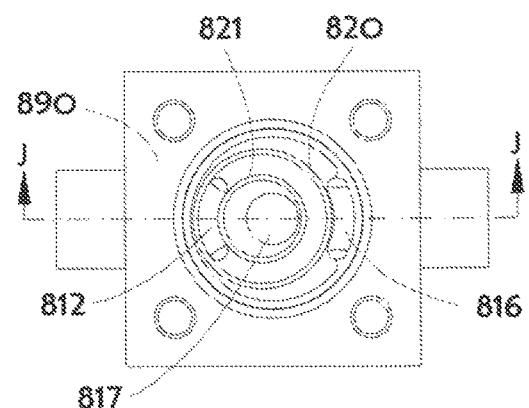
FIG. 8A is a plan view of the valve shown in FIG. 8.
Figure 8C:
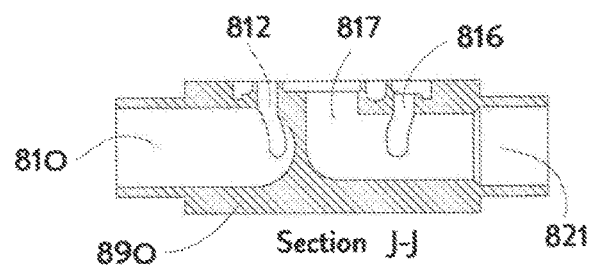
FIG. 8C is a cross-sectioned view of the valve body shown in FIG. 8.
Figure 8D:
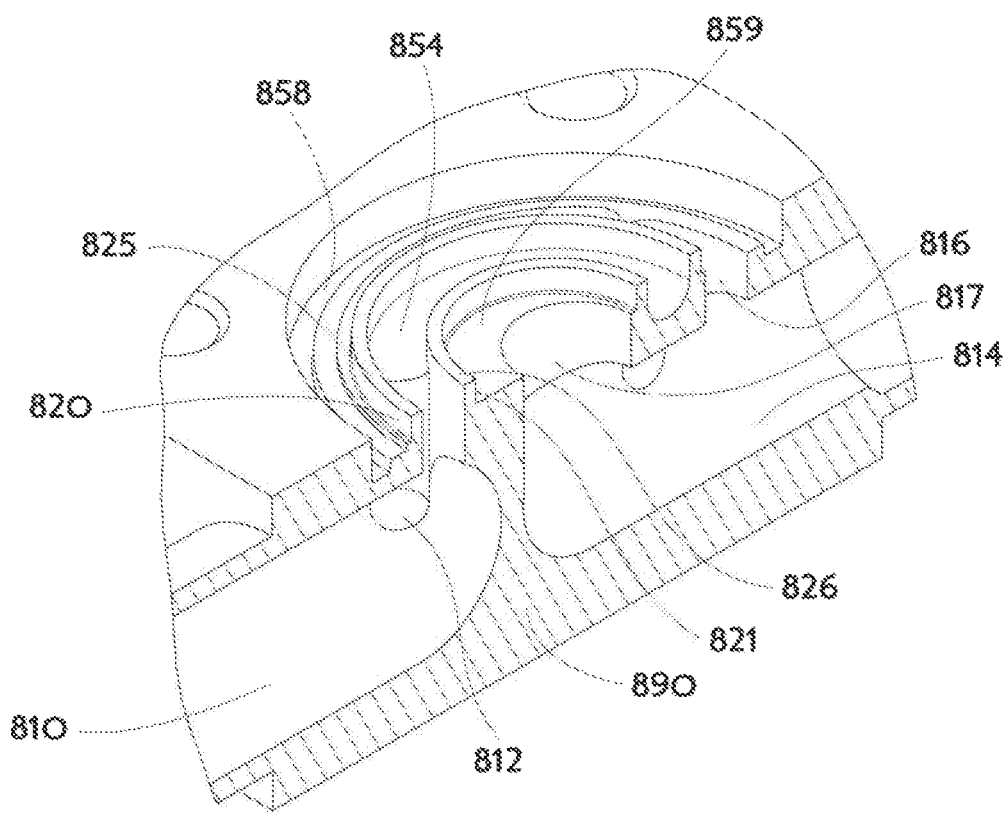
FIG. 8D is an enlarged view of FIG. 8B showing the first orifice ridge surrounding the second orifice ridge.
Figure 8E:
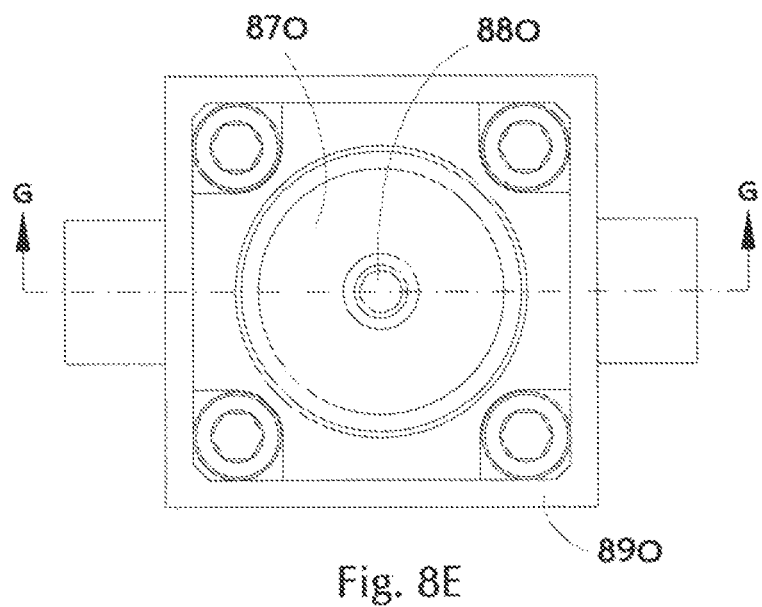
FIG. 8E is a plan view of the valve shown in FIG. 8 with an attached control element.
Figure 8F:
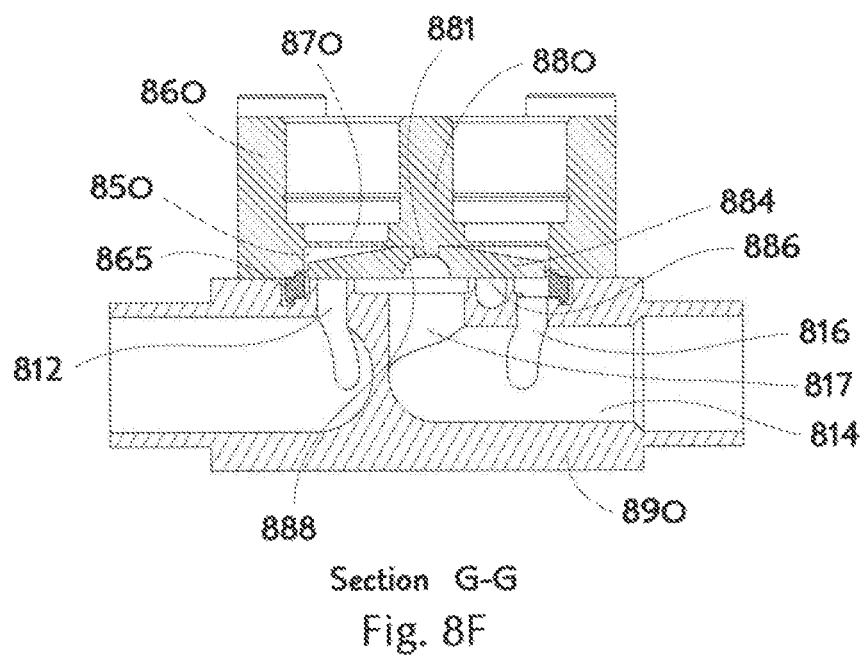
FIG. 8F illustrates a cross-sectioned view of the fluid enclosing portion of the valve shown in FIG. 8E.
Figure 9:
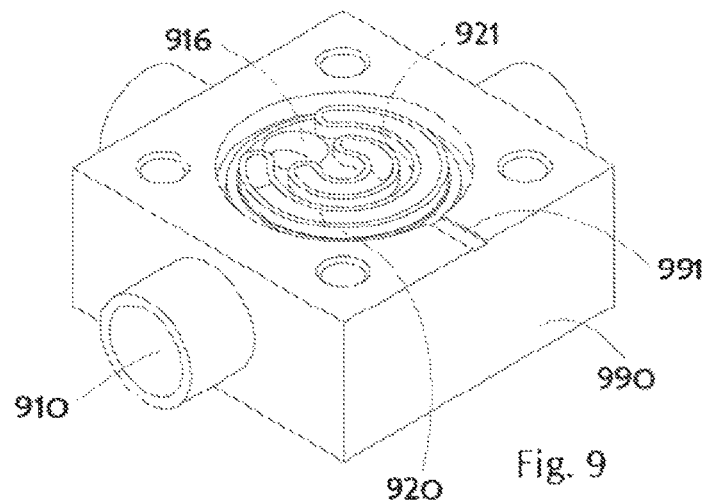
FIG. 9 illustrates a perspective view of another embodiment of a high-conductance valve in accordance with one or more aspects of the disclosure.
Figure 9A:
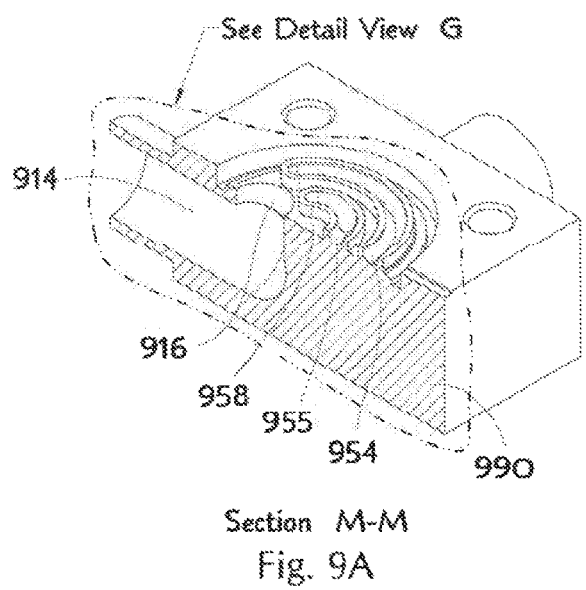
FIG. 9A is a first cross-sectioned perspective view of the valve shown in FIG. 9.
Figure 9B:
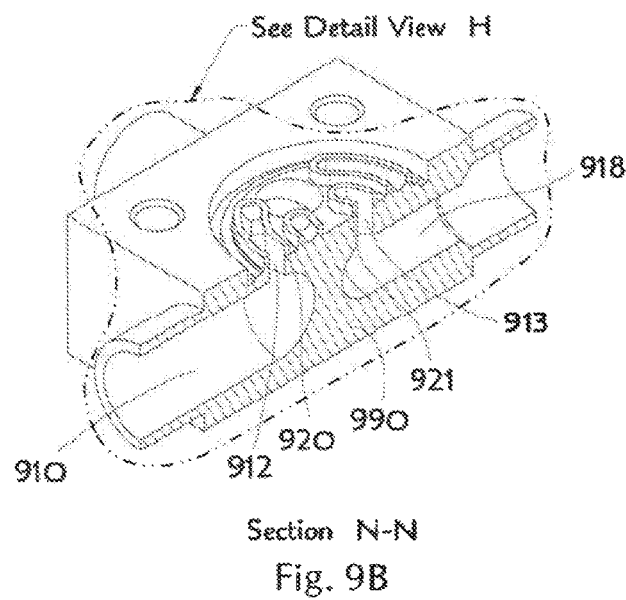
FIG. 9B is a second cross-sectioned perspective view of the valve shown in FIG. 9.
Figure 9F:
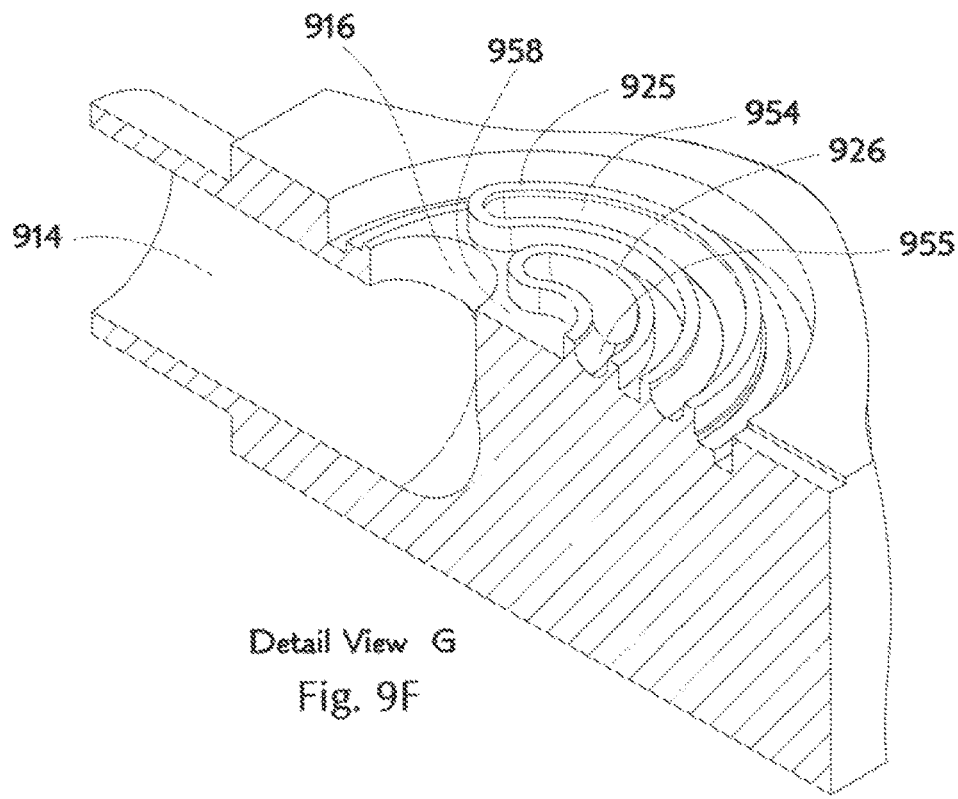
FIG. 9F is an enlarged view of FIG. 9A.
Figure 9G:
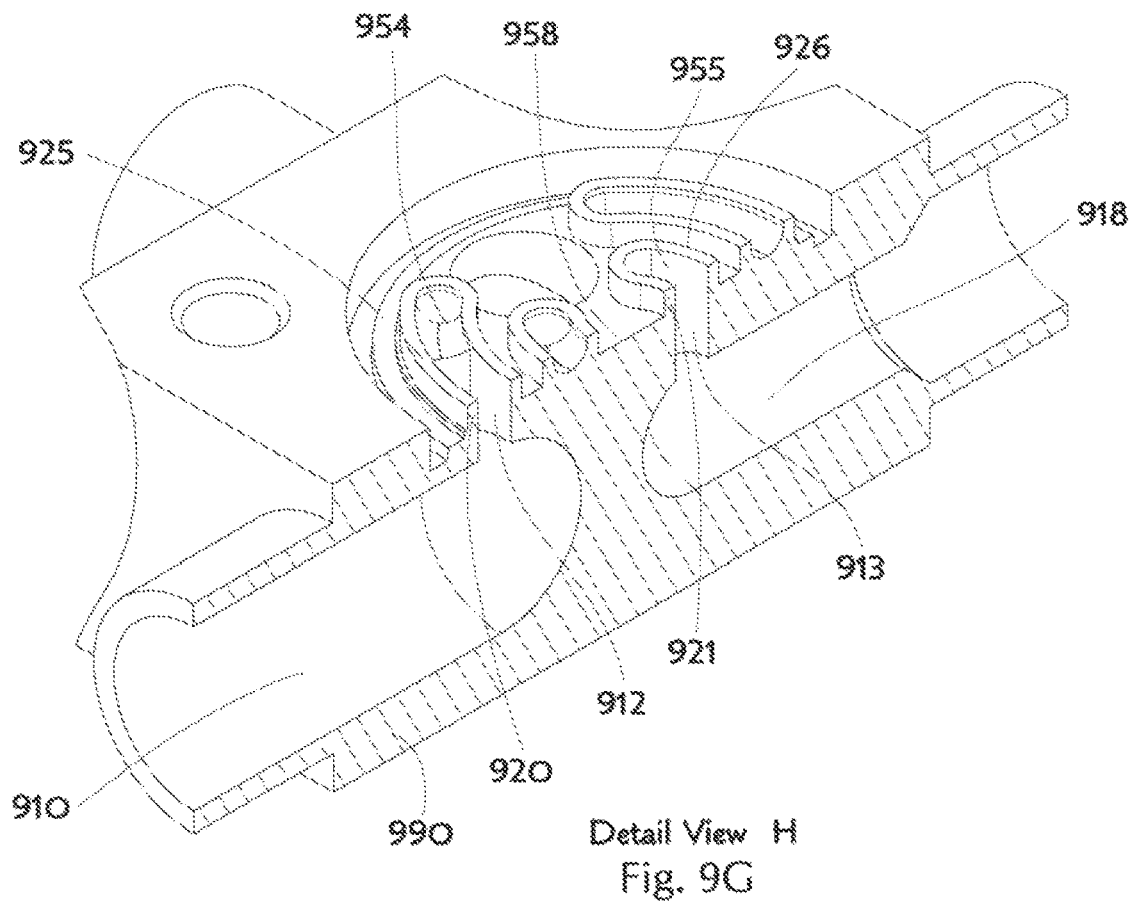
FIG. 9G is an enlarged view of FIG. 9B.

Another exemplary valve design illustrated in FIGS. 7, 7A, 7B, 7C, 7D, 7E, and 7F comprises a valve body 790, a flow collection region 708 (typically an inlet), a first fluid conduit 710 in fluid communication with the flow collection region 708, a second fluid conduit 711 in fluid communication with the flow collection region 708, a third fluid conduit 714 (typically an outlet), all of which communicate fluid to a valve chamber 750, a valve housing 760 which includes a valve chamber sealing diaphragm 770, and a control element 780 moveable by deflection of the valve chamber sealing diaphragm 770. A shank 781 may project from the sealing diaphragm 770 into the valve chamber 750 approximately centered on the axis of the control element 780. A control plate 784 with a central thru-hole having a recessed opening 788 may be affixed to the shank 781 by deforming the end of the shank 781 within the recessed opening 788. It should be understood the cross section of FIG. 7D is through the shank 781 and reveals the recessed opening 788, while the cross section of FIG. 7E is offset to reveal two of the inner fluid conduit openings 712,713. Actuator force applied to the control element 780 will move the control plate 784 to provide valve function as further explained below. A leak test groove 791 may be provided in the face of the valve body 790 to assist testing integrity of the seal 765 between the valve body 790 and the valve housing 760 which includes the diaphragm 770.

Instead of a single circular orifice, applicant has devised a plurality of non-circular orifice ridge 720, 721, 722, 723 structures (in this particular example a total of four) separating a plurality of inner fluid conduit openings 712, 713, 717, 718 from a common outer cavity 758 of the valve chamber 750. Each of the plurality of orifice ridges 720, 721, 722, 723 may be formed as a closed non-circular circuit comprising a plurality of interconnected segments surrounding a corresponding inner fluid conduit opening 712,713, 717,718. For example, each non-circular circuit may include at least one curved segment and at least one straight segment. According to certain aspects, the plurality of interconnected segments may include at least one segment that curves away from the fluid conduit opening. According to other aspects, the plurality of interconnected segments may include at least one segment that curves toward the fluid conduit opening. The exemplary orifice ridge shapes may be considered to be like a plurality of adjacent circular sectors each with added smooth curves at the ends of the corresponding radius lines. According to some embodiments, the orifice ridge may include at least one curved segment that curves away from the fluid conduit opening that is adjacent to at least one straight or linear segment. According to other embodiments, the orifice ridge may include at least one curved segment that curves toward the fluid conduit opening that is adjacent to at least one straight or linear segment. The first inner fluid conduit opening 712 provides fluid communication with the first fluid conduit 710. The second inner fluid conduit opening 713 also provides fluid communication with the first fluid conduit 710. The third inner fluid conduit opening 717 provides fluid communication with the second fluid conduit 711. The fourth inner fluid conduit opening 718 also provides fluid communication with the second fluid conduit 711. The four inner fluid conduit openings 712, 713, 717, 718 are thus all in parallel fluid communication with the flow collection region 708. An outer fluid conduit opening 716 may provide fluid communication between the outer cavity 758 and the third fluid conduit 714. The outer fluid conduit opening 716 may be disposed external to each of the plurality of orifice ridges 720, 721, 722, 723. The parts comprising said valve may be constructed from materials chosen for desired chemical inertness relative to the fluids to be handled and may include, for example, stainless steels, Monel® metals, titanium alloys, Hastelloy® nickel alloys, Elgiloy® cobalt alloy, copper alloys, aluminum alloys, or polymers such as Teflon®, Kel-F®, Vespel®, Kynar®, and combinations of metals and polymers either separate or together. For example, a type 316L stainless steel valve body 790 may be used with a Hastelloy® nickel alloy control plate 784.

The potential flow restricting effects of the outer fluid conduit opening 716 may be lessened by enlarging the opening relative to the cross-sectional area of the corresponding fluid conduit 714. Exemplary beneficial opening modifications may comprise an arcuate slot as illustrated, or a blended construction of other shaping such as flaring and beveling. The upper topmost portion of the plurality of orifice ridges 720, 721, 722, 723 may be made very flat, planar and smooth by lapping, or similar manufacturing process, and those coplanar surfaces are herein referred to as contact tracks 725, 726, 727, 728 of the plurality orifice ridges 720, 721, 722, 723. A control plate 784 having suitable likewise substantially planar control surface 786 of sufficient extent (typically a diameter) may rest against (make contact with) the entire plurality of contact tracks 725, 726, 727, 728 to effectively close off all flow through the valve body 790. The valve effective opening area, which is computed as an area defined by the periphery length of the plurality of orifice ridges 720, 721, 722, 723 in fluid communication with the flow collection region 708 multiplied by any control gap between the planar control surface 786 and the contact tracks 725, 726, 727, 728, may be advantageously enlarged by the disclosed design. The length of the plurality of non-circular orifice ridge 720, 721, 722, 723 peripheries may be made substantially greater than the circumference of a simple circular orifice occupying the same space.

Another exemplary valve design is illustrated in FIGS. 8, 8A, 8B, 8C, 8D, 8E, and 8F comprises a valve body 890, a first fluid conduit 810 (typically an inlet), a second fluid conduit 814 (typically an outlet), both of which conduits communicate fluid to a valve chamber 850, a valve housing 860 which includes a valve chamber sealing diaphragm 870, and a control element 880 moveable by deflection of the valve chamber sealing diaphragm 870. A shank 881 may project from the sealing diaphragm 870 into the valve chamber 850 approximately centered on the axis of the control element 880. A control plate 884 with a central thru-hole having a recessed opening 888 may be affixed to the shank 881 by deforming the end of the shank 881 within the recessed opening 888. Actuator force applied to the control element 880 will move the control plate 884 to provide valve function as further explained below. The valve housing 860 and valve body 890 may be removably joined as a leak-free assembly by deforming a metallic gasket 865.

A first orifice ridge 820 may be formed as a closed circuit comprising a plurality of interconnected segments surrounding an inner fluid conduit opening 812 and separating an inner valve cavity 854 from a first outer valve cavity 858 within the valve chamber 850. According to certain aspects, each of the segments forming the closed circuit may be curved, and according to further aspects, the segments may form a closed circuit that is circular in shape. A first outer fluid conduit opening 816 may connect the first outer valve cavity 858 portion to the second fluid conduit 814. The outer fluid conduit opening 816 may be disposed external to one or both of the first orifice ridge 820 and the second orifice ridge 821. As discussed above, the valve design may further include a second orifice ridge 821 that is completely surrounded by the first orifice ridge 820. The second orifice ridge 821 may be formed as a closed circuit comprising a plurality of curved segments separating the inner valve cavity 854 from a second outer valve cavity 859 portion. As will be appreciated, either of the first or second orifice ridges 820 and 821 may be non-circular in shape. For example, either of the first or second orifice ridges 820 and 821 may be a kidney or petal or other shape that includes at least one segment that either curves away from or toward the fluid conduit opening, including the orifice ridge shape included in reference to FIG. 7. A second outer fluid conduit opening 817 connected to the second fluid conduit 814 may be located within the second outer valve cavity 859 portion completely surrounded by the second orifice ridge 821. The parts comprising said valve may be constructed from materials chosen for desired chemical inertness relative to the fluids to be handled and may include, for example, stainless steels, Monel® metals, titanium alloys, Hastelloy® nickel alloys, Elgiloy® cobalt alloy, copper alloys, aluminum alloys, or polymers such as Teflon®, Kel-F®, Vespel®, Kynar®, and combinations of metals and polymers either separate or together. For example, a type 316L stainless steel valve body 890 may be used with a Hastelloy® nickel alloy control plate 884.

The potential flow restricting effects of the first outer fluid conduit opening 816, and the inner fluid conduit opening 812, may be lessened by enlarging the openings relative to the cross-sectional area of the corresponding fluid conduits 810, 814. Exemplary beneficial opening modifications may comprise arcuate slots as illustrated, or a blended construction of other shaping such as flaring and beveling. The upper topmost portion of the first and second orifice ridges 820, 821 may be made very flat, planar and smooth by lapping, or similar manufacturing process, and those coplanar surfaces are herein referred to as contact tracks 825, 826 of the first and second orifice ridges 820, 821. A control plate 884 having suitable likewise substantially planar control surface 886 of sufficient extent (typically a diameter) may rest against (make contact with) the entirety of both contact tracks 825, 826 to effectively close off all flow through the valve body 890. The valve effective opening area in fluid communication with the first fluid conduit 810 may be appreciated to be the sum of the lengths of the two contact tracks 825, 826 multiplied by any control gap between the planar control surface 886 and the contact tracks 825, 826. Thus, this effective opening area is almost twice the area available from a similarly sized simple single circular orifice design as may be appreciated by consideration of the illustrated orifice ridges 820, 821.

As previously noted with respect to FIGS. 6, 6A, 6B, 6C, and 6D, the various exemplary valve designs that include multiple orifice ridge structures may be used to provide high conductance, but they may also be used in flow splitting applications. Such an exemplary flow splitting valve design is illustrated in FIGS. 9, 9A, 9B, 9C, 9D, 9E, 9F, and 9G comprises a valve body 990, a first fluid conduit 910 (typically an outlet), a second fluid conduit 914 (typically an inlet), and a third fluid conduit 918 (typically an outlet), each of which communicate fluid to a valve chamber 950, a valve housing 960 which includes a valve chamber sealing diaphragm 970, and a control element 980 moveable by deflection of the valve chamber sealing diaphragm 970. A shank 981 may project from the sealing diaphragm 970 into the valve chamber 950 approximately centered on the axis of the control element 980. A control plate 984 with a central thru-hole having a recessed opening 988 may be affixed to the shank 981 by deforming the end of the shank 981 within the recessed opening 988. Actuator force applied to the control element 980 will move the control plate 984 to provide valve function as further explained below. A leak test groove 991 may be provided in the face of the valve body 990 to assist testing integrity of the seal 965 between the valve body 990 and the valve housing 960 which includes the diaphragm 970.

In a manner similar to that described with respect to FIGS. 6, 6A, 6B, 6C, and 6D, the valve body 990 includes a first non-circular orifice ridge 920 structure separating a first inner cavity 954 from an outer cavity 958 of the valve chamber 950. The first orifice ridge 920 may be formed as a closed non-circular circuit comprising a plurality of interconnected segments surrounding a first inner fluid conduit opening 912 in a path of changing curvature. Similar to the non-circular shapes discussed above, the plurality of interconnected segments may include at least one segment that curves away from the fluid conduit opening. The exemplary first orifice ridge 920 shape may again be considered to be like a kidney shape, as explained above, in so far as said shape includes three segments that curve toward the fluid conduit opening and one segment that curves away from the fluid conduit opening. In this exemplary valve design, the first kidney-like orifice ridge 920 structure at least partially surrounds a second similar and smaller kidney-like second orifice ridge 921 structure. This configuration allows a second inner cavity 955 to be separated from the outer cavity 958. Designers will appreciate any closed circuit shape may be implemented for the partially surrounded smaller second orifice ridge 921. The illustrated kidney-like example comprises a plurality of interconnected segments surrounding a second inner fluid conduit opening 913, where at least one segment is curved away from the second inner fluid conduit opening 913. The valve body 990 with the orifice ridges 920, 921 can be made by typical manufacturing processes such as milling, or casting, or injection molding, or recently developed additive manufacturing processes such as laser sintering (3D printing), for example. The valve body regions contacted by the controlled fluid may be subjected to additional processes, such as polishing and passivation, as is known in the art of high-purity fluid delivery.

The upper topmost portion of the first and second orifice ridges 920, 921 may be made very flat, planar and smooth by lapping, or similar manufacturing process, and those coplanar surfaces are herein referred to as contact tracks 925, 926 of the first and second orifice ridges 920, 921. A control plate 984 having suitable likewise substantially planar control surface 986 of sufficient extent (typically a diameter) may rest against (make contact with) the entirety of both contact tracks 925, 926 to effectively close off all flow through the valve body 990.

The first inner fluid conduit opening 912 provides fluid communication between the first inner cavity 954 and the first fluid conduit 910. The second inner fluid conduit opening 913 may provide fluid communication between the second inner cavity 955 and the third fluid conduit 918, which in this design is distinct from the first fluid conduit 910. An outer fluid conduit opening 916 may provide fluid communication between the outer cavity 958 and the second fluid conduit 914. The outer fluid conduit opening 916 may be disposed external to each of the orifice ridges 920 and 921. The parts comprising said valve may be constructed from materials chosen for desired chemical inertness relative to the fluids to be handled and may include, for example, stainless steels, Monel® metals, titanium alloys, Hastelloy® nickel alloys, Elgiloy® cobalt alloy, copper alloys, aluminum alloys, or polymers such as Teflon®, Kel-F®, Vespel®, Kynar®, and combinations of metals and polymers either separate or together. For example, a type 316L stainless steel valve body 990 may be used with a Hastelloy® nickel alloy control plate 984.

In the exemplary valve design illustrated in FIGS. 9, 9A, 9B, 9C, 9D, 9E. 9F, and 9G, an amount of fluid received at the outer fluid conduit opening 916 from the second fluid conduit 914 can be controllably split between the first inner fluid conduit opening 912 and second inner fluid conduit opening 913, with the split ratio being determined based upon the ratio of the periphery length of orifice ridge 921 relative to the sum of the periphery length of orifice ridge 920 and the periphery length of orifice ridge 921. For example, if the ratio of the periphery length of orifice ridge 921 relative to the sum of the periphery length of orifice ridge 920 and 921 were 0.2, then second inner fluid conduit opening 913 would receive 20% of the fluid received at outer fluid conduit opening 916. Provided that the planar control surface 986 of the control plate 984 is maintained in a parallel position relative to both contact tracks 925, 926 of the first and second orifice ridges 920, 921, the ratio of fluid provided to the first inner fluid opening 912 and the second inner fluid opening 913 will remain constant (up to where the area of the first and/or second inner fluid conduit openings 912, 913 are limiting). To ensure that the ratio of fluid is determined by the ratio of the periphery length of the orifice ridges, potential flow restricting effects of the fluid conduit openings 912, 913, 916 may be lessened by enlarging the openings relative to the cross-sectional area of the corresponding fluid conduits 910, 914, and 918. Exemplary beneficial opening modifications may comprise an arcuate slot as illustrated in the inner fluid conduit openings 912, 913 or a blended construction of other shaping such as flaring and beveling as illustrated at the outer fluid conduit opening 916.

Designers of fluid delivery apparatuses intended for proportional or modulating control of fluid flow (for example, mass flow controllers in semiconductor capital equipment) may appreciate the desirability of using a valve with maximum conductance appropriately matched to the intended apparatus maximum flow. A valve with insufficient conductance of course cannot provide the intended apparatus maximum flow, but a valve with excessive maximum conductance will force the apparatus to operate the valve only at the lowest settings and thus make control of the system potentially more difficult. Combinations of the several orifice ridge shapes described in this disclosure give the designer means to tailor the valve maximum conductance to match any particular application while staying within a chosen valve body size.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A valve comprising:
   a valve body having a first fluid conduit opening and a second fluid conduit opening;
   a first orifice ridge disposed within the valve body and having a plurality of interconnected segments that form a closed circuit surrounding the first fluid conduit opening;
   a second orifice ridge disposed within the valve body and having a plurality of interconnected segments that form a closed circuit surrounding the second fluid conduit opening; and
   a control plate having a substantially planar control surface, the control surface configured to be moveable to abut the first orifice ridge and the second orifice ridge, wherein the first orifice ridge defines a first inner cavity extending continuously between the first orifice ridge and the first fluid conduit opening, an area of the first fluid conduit opening being smaller than an area of the first inner cavity at a bottom of the first inner cavity, and wherein the plurality of interconnected segments of the first orifice ridge are interconnected inwardly and outwardly curved segments and wherein the plurality of interconnected segments of the second orifice ridge are interconnected inwardly and outwardly curved segments.

2. The valve of claim 1, further comprising a first fluid conduit formed in the valve body, wherein the first fluid conduit opening extends into the first fluid conduit.

3. The valve of claim 2, wherein a peripheral length of the first orifice ridge is substantially greater than a perimeter length of the first fluid conduit.

4. The valve of claim 2, further comprising a second fluid conduit formed in the valve body, wherein the first fluid conduit is configured as a fluid inlet to receive a flow of fluid and the second fluid conduit is configured as a fluid outlet to provide the flow of fluid.

5. The valve of claim 2, further comprising an outer fluid conduit opening disposed within the valve body external to the first orifice ridge and external to the second orifice ridge.

6. The valve of claim 5, further comprising a second fluid conduit formed in the valve body, wherein the outer fluid conduit opening extends into the second fluid conduit and the second fluid conduit opening extends into the first conduit.

7. The valve of claim 5, further comprising a second fluid conduit and a third fluid conduit, wherein the second fluid conduit opening extends into the third fluid conduit and the outer fluid conduit opening extends into the second fluid conduit.

8. The valve of claim 7, wherein the outer fluid conduit opening is configured as a fluid inlet to receive a flow of fluid from the second fluid conduit, and the first fluid conduit and the third fluid conduit are configured as fluid outlets, an amount of fluid controllably received at the outer fluid conduit opening being split between the first fluid conduit opening and the second fluid conduit opening based upon a peripheral length of the first orifice ridge relative to a sum of the peripheral length of the first orifice ridge and a peripheral length of the second orifice ridge.

9. The valve of claim 2, wherein the second fluid conduit opening extends into the first fluid conduit.

10. The valve of claim 2, further comprising:
a third orifice ridge disposed within the valve body and having a plurality of segments that form a non-circular closed circuit surrounding a third fluid conduit opening.

11. The valve of claim 10, further comprising a second fluid conduit formed in the valve body, wherein the third fluid conduit opening extends into the second fluid conduit.

12. The valve of claim 1, wherein the second orifice ridge is spaced apart from and substantially surrounded by the first orifice ridge.

* * * * *